United States Patent
Minowa

(10) Patent No.: US 7,111,119 B2
(45) Date of Patent: Sep. 19, 2006

(54) DEVICE AND METHOD FOR PERFORMING INFORMATION PROCESSING USING PLURALITY OF PROCESSORS

(75) Inventor: Nobuyuki Minowa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 10/767,074

(22) Filed: Jan. 30, 2004

(65) Prior Publication Data

US 2005/0120173 A1 Jun. 2, 2005

(30) Foreign Application Priority Data

Nov. 27, 2003 (JP) ............................ 2003-396786

(51) Int. Cl.
 *G06F 13/14* (2006.01)

(52) U.S. Cl. ................... 711/114; 711/170; 711/147; 711/114; 712/27

(58) Field of Classification Search ............... 711/170, 711/5
See application file for complete search history.

(56) References Cited

U.S. PATENT DOCUMENTS

| | | | |
|---|---|---|---|
| 5,390,299 A | 2/1995 | Rege et al. | |
| 5,710,932 A | 1/1998 | Hamanaka et al. | |
| 5,740,468 A | 4/1998 | Hirose | |
| 5,892,979 A | 4/1999 | Shiraki et al. | |
| 5,909,540 A | 6/1999 | Carter et al. | |
| 5,918,229 A | 6/1999 | Davis et al. | |
| 5,987,506 A | 11/1999 | Carter et al. | |
| 6,026,474 A | 2/2000 | Carter et al. | |
| 6,124,878 A * | 9/2000 | Adams et al. ............... | 725/118 |
| 6,148,377 A | 11/2000 | Carter et al. | |
| 6,212,582 B1 | 4/2001 | Chong et al. | |
| 6,219,728 B1 | 4/2001 | Yin | |
| 6,260,120 B1 | 7/2001 | Blumenau et al. | |
| 6,275,896 B1 | 8/2001 | Kojima | |
| 6,715,007 B1 | 3/2004 | Williams et al. | |
| 6,851,000 B1 | 2/2005 | Lai | |
| 2003/0225909 A1 * | 12/2003 | Glasco et al. ............... | 709/245 |

FOREIGN PATENT DOCUMENTS

| | | |
|---|---|---|
| EP | 0326164 | 8/1989 |
| EP | 0908825 | 4/1999 |
| EP | 908825 A1 * | 4/1999 |
| GB | 2233480 | 1/1991 |
| GB | 2375621 A | 11/2002 |
| JP | 60258669 | 12/1985 |
| JP | 63148364 | 6/1988 |
| JP | 63062068 | 3/1998 |
| JP | 2001-306265 A | 11/2001 |
| WO | 03014943 | 2/2003 |

* cited by examiner

*Primary Examiner*—B. James Peikari
*Assistant Examiner*—Leonid Kravets
(74) *Attorney, Agent, or Firm*—Mattingly, Stanger, Malur & Brundidge, P.C.

(57) ABSTRACT

The present invention makes it possible to transfer information between processors by a method that places little burden on the reception side processors. The information processing device is a device that processes information using a plurality of processors, comprising one or more first processors that have one or a plurality of local memories, and one or more second processors that write write information directly into the local memory that the target first processor has. The second processors store address maps in which local memory addresses for the first processors are recorded; these second processors acquire local memory addresses from these address maps, and write write information into the acquired local memory addresses.

33 Claims, 22 Drawing Sheets

| ADDRESS | USE |
|---|---|
| 0x0000 0000 | PCIX OR OTHER DEVICE |
| 0x1000 0000 | SMA I/O REGISTER |
| 0x2000 0000 | TRANSMISSION SM ADDRESS INFORMATION |
| 0x3000 0000 | RECEPTION SM ADDRESS INFORMATION |
| 0x4000 0000 | LM ADDRESS INFORMATION FOR OTHER MP |
| 0x5000 0000 | LM ADDRESS INFORMATION FOR OWN MP |

| START | NAME OF ADAPTER | OTHER MP # | OTHER LM ADDRESS |
|---|---|---|---|
| 0x4000 0000 | CHA0 | 00 | 0x0000 0000 |
| 0x4100 0000 | | 01 | 0x0000 0000 |
| 0x4200 0000 | CHA1 | 02 | 0x0000 0000 |
| 0x4300 0000 | | 03 | 0x0000 0000 |
| 0x4400 0000 | CHA2 | 04 | 0x0000 0000 |
| 0x4500 0000 | | 05 | 0x0000 0000 |
| 0x4600 0000 | CHA3 | 06 | 0x0000 0000 |
| 0x4700 0000 | | 07 | 0x0000 0000 |
| 0x4800 0000 | DKA0 | 08 | 0x0000 0000 |
| 0x4900 0000 | | 09 | 0x0000 0000 |
| 0x4A00 0000 | DKA1 | 0a | 0x0000 0000 |
| 0x4B00 0000 | | 0b | 0x0000 0000 |
| 0x4C00 0000 | DKA2 | 0c | 0x0000 0000 |
| 0x4D00 0000 | | 0d | 0x0000 0000 |
| 0x4E00 0000 | DKA3 | 0e | 0x0000 0000 |
| 0x4F00 0000 | | 0f | 0x0000 0000 |

BASE ADDRESS (0x5000 0000)

OTHER MP 550 (MP #"08")

| ADDRESS | USE |
|---|---|
| 0x0000 0000 | PCIX OR OTHER DEVICE |
| 0x1000 0000 | SMA I/O REGISTER |
| 0x2000 0000 | TRANSMISSION SM ADDRESS INFORMATION |
| 0x3000 0000 | RECEPTION SM ADDRESS INFORMATION |
| 0x4000 0000 | LM ADDRESS INFORMATION FOR OTHER MP |
| 0x5000 0000 | LM ADDRESS INFORMATION FOR OWN MP |
| 0x50FF FFFF | |

BASE ADDRESS (0x5000 0000)

| ADDRESS | NAME OF ADAPTER | OTHER MP # |
|---|---|---|
| 0x5000 0000 | CHA0 | 00 |
| 0x5100 0000 | | 01 |
| 0x5200 0000 | CHA1 | 02 |
| 0x5300 0000 | | 03 |
| 0x5400 0000 | CHA2 | 04 |
| 0x5500 0000 | | 05 |
| 0x5600 0000 | CHA3 | 06 |
| 0x5700 0000 | | 07 |
| 0x5800 0000 | DKA0 | 08 |
| 0x5900 0000 | | 09 |
| 0x5A00 0000 | DKA1 | 0a |
| 0x5B00 0000 | | 0b |
| 0x5C00 0000 | DKA2 | 0c |
| 0x5D00 0000 | | 0d |
| 0x5E00 0000 | DKA3 | 0e |
| 0x5F00 0000 | | 0f |

FIG. 6

| ADDRESS INFORMATION | COMMAND TYPE | WRITE DATA | CRC |

FIG. 7

| DESTINATION MP DISCRIMINATING INFORMATION | BUFFER FULL | OVER BUFFER THRESHOLD VALUE | BUFFER EMPTY | PATH ERROR | PORT CONTROLLER INTERNAL ERROR | SEQUENCE NO. | CRC |

FIG. 8

| ADDRESS INFORMATION | COMMAND TYPE | WRITE DATA | CRC |

DEVICE AND METHOD FOR PERFORMING INFORMATION PROCESSING USING PLURALITY OF PROCESSORS

CROSS-REFERENCE TO RELATED APPLICATION

This application relates to and claims priority from Japanese Patent Application No. 2003-396786 filed on Nov. 27, 2003, the entire disclosure of which is incorporated herein by reference.

BACKGROUND OF THE INVENTION

1. Field of the Invention

The present invention relates to a technique for performing information processing using a plurality of processors, and more concretely relates to (for example) a memory control device that is installed in a RAID (redundant array of independent inexpensive disks) system.

2. Description of the Related Art

One type of device for performing information processing using a plurality of processors is (for example) a memory control device which controls access from a host device to a memory device that has a plurality of physical disks arranged in the form of an array. For example, two or more channel adapters that are used for communications with the host device and two or more disk adapters that are used for communications with the memory device are installed in the memory control device. One or more microprocessors (hereafter abbreviated to "MP") are installed in each of the adapters.

Control information is exchanged between the MPs mounted in the channel adapters (hereafter referred to as "channel MPs") and the MPs mounted in the disk adapters (hereafter referred to as "disk MPs"). For example, in the technique disclosed in Japanese Patent Application Laid-Open No. 2001-306265 (e. g., paragraph 44), the exchange of control information between the channel MP 17 and disk MP 21 is accomplished via a shared memory 32. In concrete terms, for example, when control information is sent from the channel MP 17 to the disk MP 21, the channel MP 17 writes control information into a specified region of the shared memory 32; meanwhile, the disk MP 21 periodically polls this specified region of the shared memory 32, and if there is control information in this specified, region, the disk MP 21 acquires the control information from this specified region.

SUMMARY OF THE INVENTION

In the conventional technique described above, the exchange of control information between MPs is accomplished via a shared memory, and the MP on the receiving side periodically polls a specified region of the shared memory. This polling of the shared memory places a not inconsiderable burden on the receiving side MP. Furthermore, as the number of MPs increased, frequent repetition of the reading of the shared memory by the plurality of MPs tends to cause a performance bottleneck in the shared memory or a performance bottleneck in the shared memory path; as a result, there is a possibility that the performance of the device as a whole will be lowered.

Accordingly, it is an object of the present invention to allow the reception of information among processors by a method that places little burden on the receiving side processor.

Another object of the present invention is to allow the reception of information among processors without lowering the performance of the device as a whole.

Other objects of the present invention will become clear from the following description.

The information processing device according to a first aspect of the present invention comprises one or more first processors that have one or a plurality of local memories, and one or more second processors which directly write write information into a target local memory that a target first processor selected from among the first processors has, and/or which directly read read information (information that is the object of reading) from the abovementioned target first local memory.

Here, the term "processor" refers to a module that performs operational processing; concrete examples of such processors include CPUs (central processing units) or MPs (microprocessors).

Furthermore, the term "local memory" refers to a memory that can be used only by the first processors; for example, such memories include memories such as RAM or the like used by CPUs, memories that are mounted inside or outside MPs (RAM or separate cache memories) and the like.

Furthermore, the term "write information" refers to (for example) messages for the target first processor, or read commands requesting the reading of information from the local memory of this first processor.

In a first preferred embodiment of this invention, the information processing device further comprises an address map memory means which store an address map on which the local memory addresses for each of the abovementioned one or more first processors are recorded, and each of the abovementioned one or more second processors acquires the local memory address of the target first processor from the abovementioned address map, and writes the abovementioned write information into the acquired local memory address, and/or reads the abovementioned read information from the acquired first local memory address.

In a second preferred embodiment of the present invention, one or a plurality of second local memories belonging to each of the abovementioned one or more second processors, first address map memory means (for example, the second processors may have these means) which store a first address map on which first local memory addresses for each of the abovementioned one or more first processors are recorded, and second address map memory means (for example, the first processors may have these means) which store a second address map on which second local memory addresses for each of the abovementioned one or more second processors are recorded, are further provided. A target second microprocessor selected from among the abovementioned one or more second processors acquires a first local memory write address where writing is to be performed in the target first local memory (for example, a first local memory read address which indicates the location in the target first local memory reading is to be performed is further acquired from the first address map), and writes a specified read command (e. g., a read command that designates the acquired first local memory read address) into the acquired first local memory write address. In response to the abovementioned read command that is written into the first local memory write address, the abovementioned target first processor acquires the second local memory write address of the target second processor that originated the abovementioned read command from the second address map, and writes information in the first local memory (for example, the information in the abovementioned first local memory write address identified from the abovementioned read command) into the acquired second local memory write address.

In a third preferred embodiment of this invention, the information processing device comprises a relay device which receives the abovementioned write information from the abovementioned second processor side, and transfers this write information to the abovementioned target first processor side. The abovementioned relay device comprises a relay memory; when transferring the abovementioned write information, one of the following two operations is selectively performed: i. e., either the abovementioned transfer is performed after the write information is selectively stored in the relay memory, or else the transfer is performed without storing the write information in the abovementioned memory.

In a fourth preferred embodiment of this invention, the information processing device further comprises one or a plurality of devices that have the abovementioned one or more first processors. The relay device further comprises one or a plurality of transmitting parts which are connected so that these transmitting parts can communicate with the abovementioned one or a plurality of first devices, and which respectively transmit the received write information to said one or said plurality of first devices. When transmitting write information received by a certain second device to the target first device that has the abovementioned target first processor, if the target transmitting part that is to transmit this write information is not in a busy state, the received write information is transmitted to the target first device from the abovementioned target transmitting part without being stored in the relay memory. If the abovementioned target transmitting part is in a busy state, the write information is temporarily stored in the relay memory, and this write information is read out from the relay memory and transmitted to the abovementioned target first device from the target transmitting part when the busy state of the target transmitting part is released.

Here, the term "transmitting part" may refer to any part that can transmit the received write information to the abovementioned target first device; for example, a communications port or path is conceivable as such a transmitting part.

In a fifth preferred embodiment of this invention, one or more write information storage regions respectively corresponding to one or more transmission sources or transmission destinations of the write information are provided in the relay memory in the abovementioned third preferred embodiment, and when temporarily storing the received write information in the relay memory, the relay device stores this write information in the target write information storage region corresponding to the transmission source or transmission destination. In this case, if the amount of information accumulated in the abovementioned target write information storage region exceeds a first threshold value, a notification of exceeding the first threshold value, which indicates that this threshold value has been exceeded, is transmitted to a specified second device, and the second device that receives the abovementioned notification of exceeding the first threshold value reduces the frequency with which write information is issued or the amount of write information that is issued to the abovementioned target local memory or the abovementioned target first processor.

Here, the term "transmission source" refers to (for example) the second processor that outputs the write information, or the second device in which this processor is mounted, and the term "transmission destination" refers to (for example) the local memory that is the storage destination of the write information, or the first processor that has this local memory.

For example, methods that can be used to "reduce the frequency with which write information is issued or the amount of write information that is issued" include the following two methods:

(1) The abovementioned relay device transmits a first interrupt signal to the second processor that is the transmission destination of the write information, or to all of the second processors including this second processor, and the second processor that has received this first interrupt signal itself reduces the frequency with which write information is issued or the amount of write information that is issued to the abovementioned target first processor.

(2) The second processor that has received the abovementioned notification of exceeding the first threshold value does not itself reduce the frequency with which write information is issued or the amount of write information that is issued to the abovementioned target first processor; instead, the information transmission control parts in the second devices mounting the abovementioned one or more second processors receive the information that is output from the second processors, and when this write information is information whose destination is the local memory of the target first processor, the transmission of the write information to the relay device is stopped or interrupted. On the other hand, when this write information is not information whose destination is the local memory of the target first processor, this write information is transmitted to the relay device.

In a sixth preferred embodiment of this invention, one or more write information storage regions respectively corresponding to the abovementioned one or more transmission sources or transmission destinations are provided in the relay memory in the abovementioned third preferred embodiment. When temporarily storing the received write information in the relay memory, the relay device stores this write information in a target write information storage region corresponding to the transmission source or transmission destination. In this case, if the amount of information accumulated in the abovementioned target write information storage region exceeds a second threshold value, notification of exceeding the second threshold value, which indicates that this threshold value has been exceeded, is transmitted to a specified second device. This second device selectively executes the operation of a direct write system in which the abovementioned write information is directly written into the target local memory, or the operation of an indirect write system which is devised so that the abovementioned write information is stored in the relay memory, and so that the abovementioned target first processor can acquire this write information from the relay memory. When the abovementioned notification of exceeding the second threshold value is not received, the write information is transmitted by the abovementioned direct write system (for example, write information including the local memory address of the abovementioned target first processor is transmitted), while when the abovementioned notification of exceeding the second threshold value is received, the write information is transmitted by the abovementioned indirect write system (for example, write information that includes the relay memory address corresponding to the abovementioned target first storage region in the relay memory is transmitted).

A seventh preferred embodiment of this invention is the abovementioned fifth preferred embodiment, wherein if the amount of information accumulated in the abovementioned target write information storage region exceeds a second threshold value that is larger than the abovementioned first threshold value, the relay device transmits a notification of exceeding the second threshold value, which indicates that this threshold value has been exceeded, to the abovementioned second device. The abovementioned second device selectively executes the operation of a direct write system in which the write information is directly written into the target local memory, or the operation of an indirect write system which is devised so that the write information is stored in the relay memory, and so that the abovementioned target first processor can acquire this write information from the relay memory. When the abovementioned notification of exceeding the second threshold value is not received (even though the abovementioned notification of exceeding the first threshold value is received), the write information is transmitted via the abovementioned direct write system, while when the abovementioned notification of exceeding the second threshold value is received, the abovementioned direct write system is stopped, and the write information is transmitted via the abovementioned indirect write system.

An eighth preferred embodiment of this invention is the abovementioned sixth preferred embodiment, wherein after the second device that has received the abovementioned notification of exceeding the second threshold value has selected the abovementioned indirect write system, this second device stops the indirect write system and selects the abovementioned direct write system in at least one of the following cases (1) and (2):

(1) A case in which the amount of information in the abovementioned target information storage region is equal to or less than a third threshold value which is smaller than the abovementioned second threshold value, and (2) a case in which a fixed time has elapsed in the state in which the abovementioned indirect write system was selected.

In a ninth preferred embodiment of this invention, the information processing device comprises one or a plurality of first devices that have the abovementioned one or more first processors, one or a plurality of second devices that have the abovementioned one or more second processors, and a relay device that relays the abovementioned write information from the abovementioned second devices to the abovementioned first device that has the target first processor. The abovementioned relay device has one or a plurality of transmitting parts that respectively transmit information to the abovementioned one or a plurality of first devices, and one or a plurality of receiving parts that respectively receive information from the abovementioned one or a plurality of second devices. Each of the abovementioned one or a plurality of transmitting parts and each of the abovementioned one or a plurality of receiving parts operate independently of each other. For example, one or more memory devices (e. g., volatile or non-volatile memories) are provided between the one or a plurality of transmitting parts and one or a plurality of receiving parts, and the abovementioned independent operation is made possible by storing the information that is exchanged between the abovementioned one or a plurality of transmitting parts and one or a plurality of receiving parts in the abovementioned one or more memory devices.

In a tenth preferred embodiment of this invention, one or more local storage regions respectively corresponding to the abovementioned one or more second processors are provided in the local memories of each of the abovementioned one or more first processors. Each of the abovementioned one or more second processors stores an address map on which the local memory address of the abovementioned local storage region corresponding to this second processor is recorded for each first processor, and when the write information is written into the local memory of the target first processor, the local memory address corresponding to this target first processor is acquired from the abovementioned address map, and the write information is written into this acquired local memory address.

In an eleventh preferred embodiment of this invention, the abovementioned information processing device comprises a relay device which receives the abovementioned write information including the local memory address of the target first processor from the abovementioned second processor side, and transfers this write information to the abovementioned target first processor side. Each of the abovementioned one or more second processors is connected via the relay device so as to be able to respectively communicate with the abovementioned one or more first processors via one or more logical or physical paths. The relay device stores one or more local memory addresses respectively corresponding to the abovementioned one or more paths for each second processor, and when the abovementioned received write information is transferred, the target path corresponding to the abovementioned local memory address contained in this write information is specified, and the write information is transferred to the abovementioned target first processor side via the specified target path.

The memory control device according to a second aspect of the present invention is a memory control device which comprises a plurality of microprocessors and a physical or logical memory device, and which performs memory control of the storage of information from host devices in the abovementioned memory device using the abovementioned plurality of microprocessors. This memory control device comprises one or more first microprocessors that have one or a plurality of first local memories, one or more second microprocessors, and first address map memory means for storing a first address map on which the first local memory addresses for each of the abovementioned one or more first microprocessors are recorded. Each of the abovementioned one or more second microprocessors acquires a first local memory write address indicating where writing is to be performed into the abovementioned target first local memory, and writes write information into this acquired first local memory write address.

In a first preferred embodiment of this invention, the memory control device further comprises one or a plurality of first devices in which the abovementioned one or more first microprocessors are mounted, one or a plurality of second devices in which the abovementioned one or more second microprocessors are mounted, and a relay device which relays communications between the abovementioned one or a plurality of first devices and the abovementioned one or a plurality of second devices. One or more local storage regions that respectively correspond to the abovementioned one or more second microprocessors are provided in the abovementioned first local memories. First local memory addresses of the one or more local storage regions that respectively correspond to the abovementioned one or more second microprocessors are recorded on the abovementioned first address map. Each of the abovementioned one or more second microprocessors is connected via the relay device so as to be able to respectively communicate with the abovementioned one or more first microprocessors via one or more logical or physical paths, and when outputting the abovementioned write information, the second microprocessors acquire the first local memory address of the first local storage region corresponding to the abovementioned target first processor from the abovementioned first address map, and output write information which has first transmission destination information that includes the abovementioned acquired first local memory address (e. g., information which includes only the local memory address, or which also includes write information destination microprocessor discriminating information). The relay device stores one or more sets of second transmission destination information that respectively correspond to the abovementioned one or more paths (e. g., local memory addresses or destination microprocessor discriminating information corresponding to these addresses), and when transferring the received write information, the relay device specifies the target path based on the abovementioned first and second transmission destination information, and transmits the write information to the abovementioned target first device via the specified target path. The target first device writes the write information received from the relay device into the first local memory address that is included in the write information.

In a second preferred embodiment of this invention, the abovementioned relay device comprises a relay memory, and when transferring the abovementioned write information, selectively performs an operation of this transfer after the write information has been temporarily stored in the relay memory, or an operation of this transfer without storing the write information in the relay memory.

A third preferred embodiment of this invention is the abovementioned second preferred embodiment, wherein the abovementioned relay device further comprises one or a plurality of transmitting parts that are connected so that these transmitting parts can communicate with the abovementioned one or a plurality of first devices, and that respectively transmit the received write information to the abovementioned one or a plurality of first devices, and when transmitting write information received from a certain second device to the abovementioned target first device, if the abovementioned target path is not in a busy state, the received write information is transmitted to the target first device via the this target path without being stored in the relay memory, while if the target path is in a busy state, the write information is temporarily stored in the relay memory, and when the busy state of the target path is released, the write information is read out from the relay memory and transmitted to the target first device via the target path.

A fourth preferred embodiment of this invention is the abovementioned second preferred embodiment, wherein one or more write information storage regions respectively corresponding to the one or more transmission sources or transmission destinations of the write information are provided in the abovementioned relay memory. When temporarily storing the received write information in the relay memory, the abovementioned relay device stores this write information in a target write information storage region corresponding to the transmission source or transmission destination; in this case, if the amount of information accumulated in the target write information storage region exceeds the first threshold value, a notification of exceeding the first threshold value, which indicates that this threshold value has been exceeded, is transmitted to a specified second device. The second device that has received this notification of exceeding the first threshold value reduces the frequency with which write information is issued or the amount of write information that is issued to the abovementioned target local memory or the abovementioned target first microprocessor.

Here, the term "transmission source" refers to (for example) the second microprocessor that outputs the write information, or the second device in which this microprocessor is mounted, and the term "transmission destination" refers to the local memory that is the storage destination of the write information, or the first microprocessor that has this local memory.

A fifth preferred embodiment of this invention is the abovementioned second preferred embodiment, wherein the abovementioned relay device comprises one or a plurality of transmitting parts that respectively transmit information to the abovementioned one or a plurality of first devices, and one or a plurality of receiving parts that respectively receive information from the abovementioned one or a plurality of second devices, and each of the abovementioned one or a plurality of transmitting parts and one or a plurality of receiving parts operate independently from each other.

A sixth preferred embodiment of this invention is the abovementioned fifth preferred embodiment, wherein the abovementioned relay device comprises a receiving buffer that is separate from the abovementioned relay memory, and each of the abovementioned one or a plurality of receiving parts temporarily store the write information that is received from the abovementioned second devices in this receiving buffer.

The memory control device according to a third aspect of the present invention is a memory control device which comprises a plurality of microprocessors and a physical or logical memory device, and which controls the storage of information from host devices in the abovementioned memory device using the abovementioned plurality of microprocessors. This memory control device comprises one or more first microprocessors that have one or a plurality of first local memories, one or more second microprocessors that have one or a plurality of second local memories, first address map memory means for storing a first address map on which first local memory addresses for each of the abovementioned one or more first microprocessors are recorded, and second address map memory means for storing a second address map on which second local memory addresses for each of the abovementioned one or more second microprocessors are recorded. A target second microprocessor selected from among the abovementioned one or more second microprocessors acquires, from the first address map, a first local memory write address indicating where writing is to be performed in a target first local memory which a target first microprocessor selected from among the abovementioned one or more first microprocessors has, and writes a read command into the acquired first local memory write address. In response to the read command that is written into first local memory write address, the target first microprocessor acquires, from the second address map, the second local memory write address of the target second microprocessor that originated the abovementioned read command, reads out read information from the first local memory, and writes the read information into the acquired second local memory write address.

Furthermore, for example, the abovementioned "write information" or "read information" or "read information" may be messages (in other words, control information) of a fixed data length (or variable data length) that are exchanged between the processors, or may be information desired by the user (e. g., files created by means of application programs or the like) that is the object of writing or reading designated by the user.

In the information processing device and memory control device of the present invention, the second processors write write information directly into the local memory of the target first processor, and/or read read information directly from this local memory. For example, in the case of direct writing, the target first processor can acquire write information that is output from a second processor by polling its own local memory. The length of time for which the first processor reads the local memory is short compared to the length of time for which a shared memory is read (e. g., 1/10 the time or less). Accordingly, with little burden, the first processor can acquire write information that is output from a second processor. In other words, the drop in the performance of the processors, shared memory and shared memory paths that is caused by periodic reading of the shared memory as in conventional devices can be prevented.

BRIEF DESCRIPTION OF THE DRAWINGS

FIG. 2 shows one example of the address map that is stored in each MP 360 (and 550);

FIG. 6 shows an example of the construction of the commands that are sent to the port controller 410 from the host hub 310;

FIG. 7 shows an example of the construction of the status information that is received by the host hub 310 from the port controller 410;

FIG. 8 shows an example of the construction of the commands that are received by the disk hub 510 from the port controller 410;

DESCRIPTION OF THE PREFERRED EMBODIMENTS

Below, a disk array control device in which an information processing device constituting one embodiment of the present invention is used will be described with reference to the attached figures.

Embodiment 1

Figure 1:
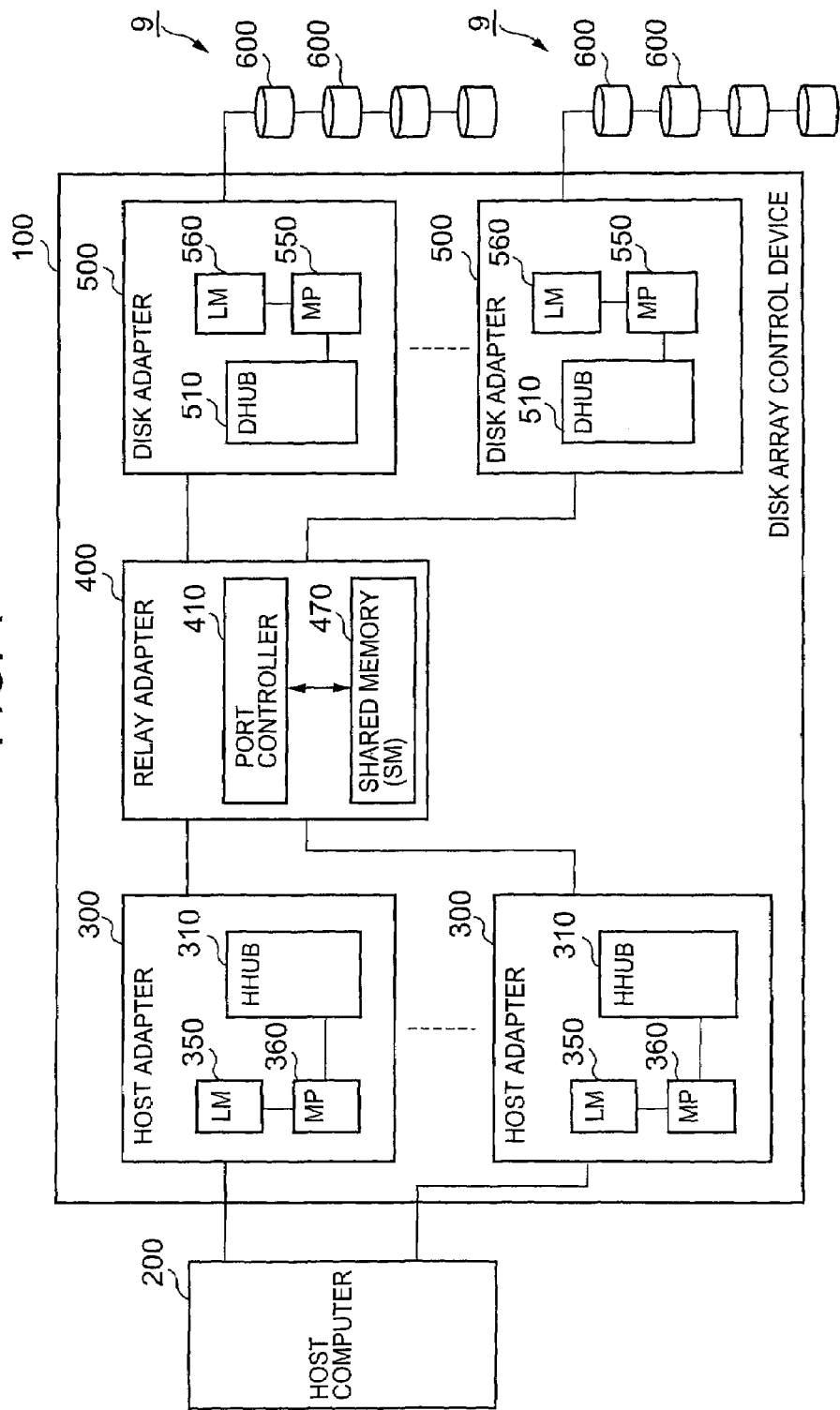
FIG. 1 shows the construction of a disk array control apparatus constituting a first embodiment of the present invention.

FIG. 1 shows the construction of a disk array control device constituting the first embodiment of the present invention.

The disk array control device 100 shown in this figure is (for example) a RAID (redundant array of independent inexpensive disks) device; one or a plurality of host computers 200 and a plurality of physical disk groups 9 are connected to this device 100.

The host computer (hereafter appropriately abbreviated to "host") 200 is (for example) a personal computer, work station or the like, and is a computer machine that comprises a CPU (central processing unit), a memory and the like. Various functions are realized by the execution of various types of programs by the CPU of the host 200. For example, the host 200 transmits write commands that write desired data into the physical disk groups 9 (e. g., logical devices or logical recording regions called logical units), and read commands that read desired data from the physical disk groups 9, to the disk array control device 100 via a communications network such as LAN or the like.

The physical disk groups 9 have a plurality of disk type memory devices 600 that are disposed in the form of an array. Physical memory regions or logical memory regions (e. g., logical devices or logical recording regions called logical units) are disposed in the physical disk groups 9, and data from the host computer 200 is written into the respective memory regions. Furthermore, various types of devices such as hard disk drives, flexible disk drives, semiconductor memory devices and the like can be used as the disk type memory devices 600.

The disk array control device 100 is a device which is used to control the access of the host computer 200 to the plurality of physical disk groups 9. In concrete terms, the disk array control device 100 receives read requests from the host computer 200, acquires the data for which reading is requested from the physical disk groups 9 (e. g., from a specified logical memory region), and transfers this data to the host computer 200; furthermore, the disk array control device 100 receives write requests together with write data from the host computer 200, and stores this write data in the physical disk groups 9. A plurality of host adapters 300 (or one host adapter 300), a plurality of disk adapters 500 (or one disk adapter 500), and a relay adapter 400 which is connected to the plurality of host adapters 300 and plurality of disk adapters 500, are provided in the disk array control device 100.

Each host adapter 300 is connected to one or a plurality of host computers 200 via an communications network such as an LAN or the like so that these host adapters 300 can communicate with the host computers 200; furthermore, each host adapter 300 is connected (e. g., star-connected) to the relay adapter 400 via a specified communications interface so that communication is possible. The respective host adapters 300 can be constructed from hardware circuits (or from software or a combination of hardware and software); these host adapters 300 control communications between this disk array control device 100 and the host computer(s) 200 that are connected to this disk array control device 100. Each host adapter 300 has a communications interface used to perform communications with the connected host 200; furthermore each host adapter 300 also has a command processor function used to interpret and process various types of commands received from the host 200. In concrete terms, each host adapter 300 comprises one or a plurality of microprocessors (hereafter referred to as "host side MPs") 360, one or more local memories (e. g., one local memory; hereafter referred to as the "host side LM") 350 dedicated to each host side MP 360, and a host hub (in other words, for example, an adapter of the host side MP 360 for the relay adapter 400) 310 which connects each host side MP 360 with the relay adapter 400 so that communication is possible.

Each disk adapter 500 is connected to one physical disk group 9 (or a plurality of physical disk groups 9) via a specified communications interface (e. g., an SAN (storage area network) or the like) so that communication is possible, and is connected (e. g., star-connected) with the relay adapter 400 via a specified communications network so that communication is possible. The respective disk adapters 500 can be constructed from hardware circuits (or from software or a combination of hardware and software); these disk adapters 500 control communications between this disk array control device 100 and the physical disk groups 9 that are connected to the disk array control device 100. In concrete terms, each disk adapter 500 comprises one or a plurality of microprocessors (hereafter referred to as "disk side MPs") 550, one or more local memories (hereafter referred to as "disk side LMs") 560 that are dedicated to the respective disk side MPs 550, and a disk hub (in other words, for example, an adapter of the disk side MPs 550 for the relay adapter 400) 510 which is used to connect the respective disk side MPs 550 with the relay adapter 400 so that communication is possible.

The relay adapter 400 has a port controller 410 which is used to control communications among the plurality of adapters 300 and 500, and a shared memory ("shared memory" is hereafter abbreviated to "SM") 470 which is shared by plurality of MPs 360 and 550. The SM 470 contains a buffer region in which messages are temporarily stored in the case of the direct LM write system, and a cache region in which messages are stored in the case of the indirect LM write system. Furthermore, sub-buffer regions corresponding to each of the MPs 360 and 550 are provided in at least the buffer region (or in both the buffer region and the cache region). Accordingly, for example, when temporarily storing a message output by a certain host side MP 360 in the direct LM write system in the SM 470, this message is stored in the sub-buffer region that corresponds to the host side MP 360 that is the transmission source of the message. Furthermore, the abovementioned "direct LM write system" refers to a system in which message transmission side MPs 360 (or 550) write messages directly into the LMs 560 (or 350) of receiving side MPs 550 (or 360) without the interposition of these receiving side MPs 550 (or 360). On the other hand, the "indirect LM write system" refers substantially to a shared memory system in which transmission side MPs 360 (or 550) write messages into the cache region of the SM 470, and receiving side MPs 550 (or 360) acquire these messages by polling this cache region, and write the messages into their own LMs 560 (or 350).

In such a construction, the host side MPs 360 can directly write messages (control information that is exchanged between MPs) into specified or desired disk side LMs 560 via the port controller 410 of the relay adapter 400 without the interposition of the disk side MPs 550. Similarly, the disk side MPs 550 can directly write messages into desired host side LMs 350 via the port controller 410 of the relay adapter 400 without the interposition of the host side MPs 360. One example of a device for making this possible is the storage of an address map on which the address of at least one LM 350 or 560 (hereafter referred to as "LM address") belonging to at least one other MP 360 or 550 is stored in each MP 360 or 550. As a result, each MP 360 or 550 can acquire desired or specified LM addresses from this address map, and can write messages into these LM addresses via the port controller 410 of the relay adapter 400. This point will be described in concrete terms below.

FIG. 2 shows one example of the address map stored in each MP 360 (and 550).

Various types of information are recorded on the address map 4 stored in each MP 360 (and 550), e. g., host MP 360 whose MP discriminating information (shown as "MP #" in the figures) is "00". However, examples of the main types of information are transmission SM address information, reception SM address information, other MP LM address information, and own MP address information.

The transmission SM address information is information that indicates the address of the SM 470 in which messages are to be stored when messages are transmitted to another MP 550 (or 360) by a host side MP 360 via the direct LM write system. For example, this transmission SM address information includes discriminating information for a single specified other MP 550 (or 360) or a plurality of specified other MPs 550 (or 360), and one or a plurality of SM address ranges (one or a plurality of SM addresses) respectively corresponding to said one or a plurality of other MPs.

The reception SM address information is information that indicates the address of the SM 470 that is to be read when messages are received from other MPs 550 (or 360) by the indirect LM write system. For example, this reception SM address information includes discriminating information for a single specified other MP 550 (or 360) or a plurality of specified other MPs 550 (or 360), and one or a plurality of SM address ranges (one or a plurality of SM addresses) respectively corresponding to said one or a plurality of other MPs.

The LM address information for other MPs is information that includes the respective LM addresses of the specified one or a plurality of other MPs (as is shown in the figures, the own MP LM address may also be included). For example, in concrete terms, as is shown in FIG. 2, discriminating information (e. g., adapter names) for one or more (e. g., eight) adapters 300 and 500, discriminating information for one or more (e. g., 15 excluding MP # "00") other MPs 550 (or 360) mounted in the one or more adapters 300 and 500, and LM address ranges (one or a plurality of LM addresses that allow direct writing) for one or more LMs 560 (or 350) belonging to the abovementioned one or more other MPs 550 (or 360), are included in the LM address information for other MPs.

The own MP LM address information is information LM address ranges for one or more LMs 350 (or 560) belonging to the MP in question. In concrete terms, for example, as is shown in the figure, LM address ranges (one or a plurality of LM addresses) respectively corresponding to one or more transmission source MPs 360 or 550 are included in the own MP LM address information of a disk side MP 550 (e. g., MP # "08") that is the destination of messages from the host side MP 360 that is MP # "00".

Thus, an address map 4 of the type described above is recorded in the program address space of each MP 360 and 550. As a result, when a write command is executed to the LM address of an arbitrary target MP 550 (or 360) by the processing of the micro-program of such an MP 360 (or 550), a message is written into the LM 560 (or 350) of the target MP 550 (or 360). Specifically, the abovementioned MP 360 (or 550) can directly write messages into a specified or desired disk side LM 560 via the port controller 410 of the relay adapter 400 without the interposition of the destination MP 550 (or 360). In concrete terms, for example, in a case where the host side MP 360 that is MP # "00" issues a message to the disk side MP 550 that is MP # "08", this host side MP 360 acquires the LM address corresponding to the disk side MP 550 that is MP # "08" from its own address map 4, produces a direct write command (described later) that includes this LM address and the desired message, and transmits this direct write command to the relay adapter 400. Consequently, this direct write command is transferred from the relay adapter 400 to the disk adapter 500 that has the disk side MP 550 that is MP # "08". Then, the message that is contained in this direct write command is stored in the LM address that corresponds to the host side MP 360 that is the transmission source (the MP that is MP # "00") in the disk side LM 560 of the host side MP 550 that is MP # "08".

Furthermore, the base address shown in the figure is an address that indicates the offset of the LM 560 (or 350), and is a specified set value of the hub 510 (or 310) of the adapter 500 (or 300) in which the target MP 550 (or 360) is mounted; this value is set beforehand by the target MP 550 (or 360) using a micro-program.

Below, the constructions and functions of the host adapter 300, relay adapter 400 and disk adapter 500 will be described in detail using a case in which a host side MP 360 issues a message to a desired disk side LM 560 as an example.

Figure 3:
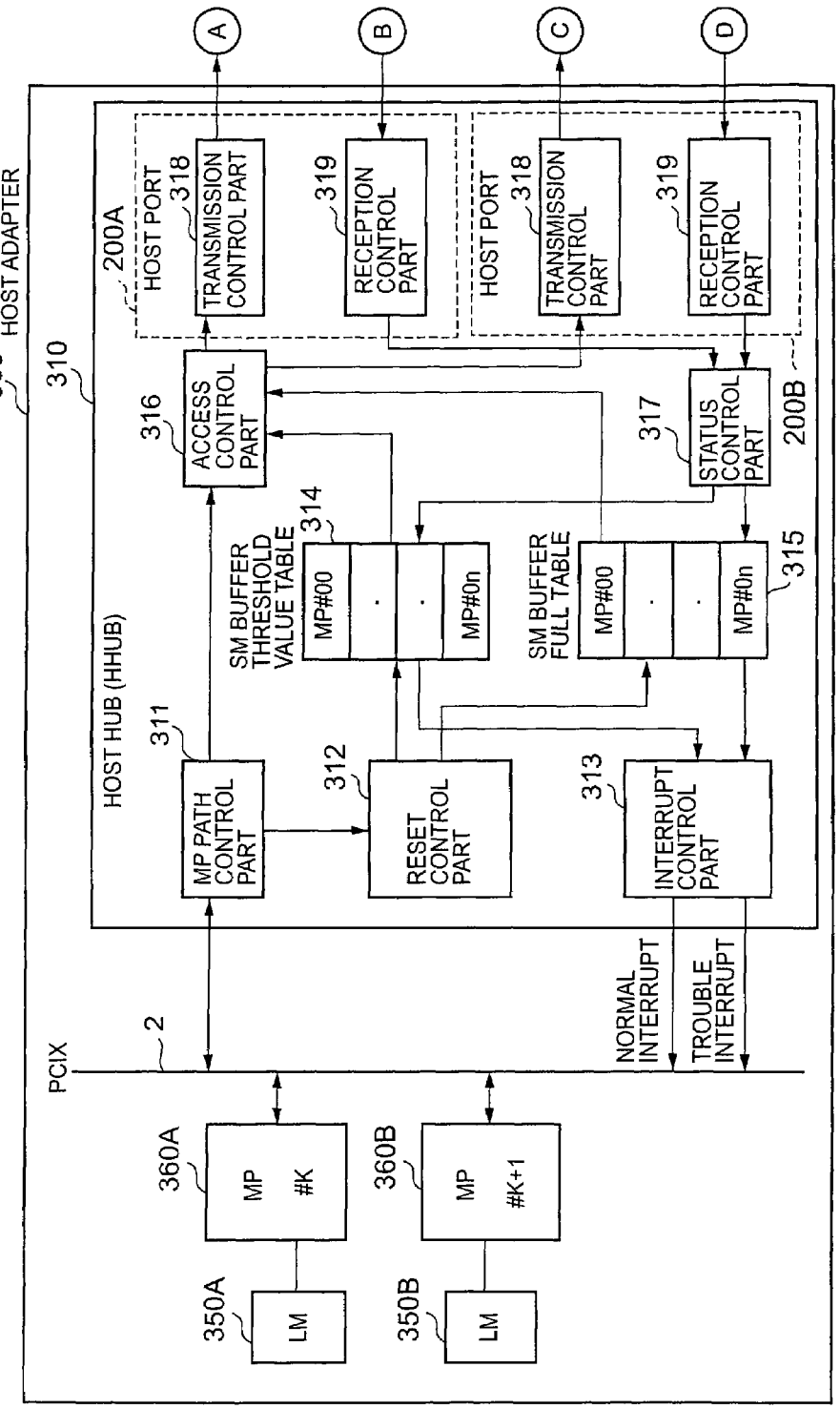
FIG. 3 is a block diagram which shows the function and construction of the host adapter 300 in detail.
Figure 4:
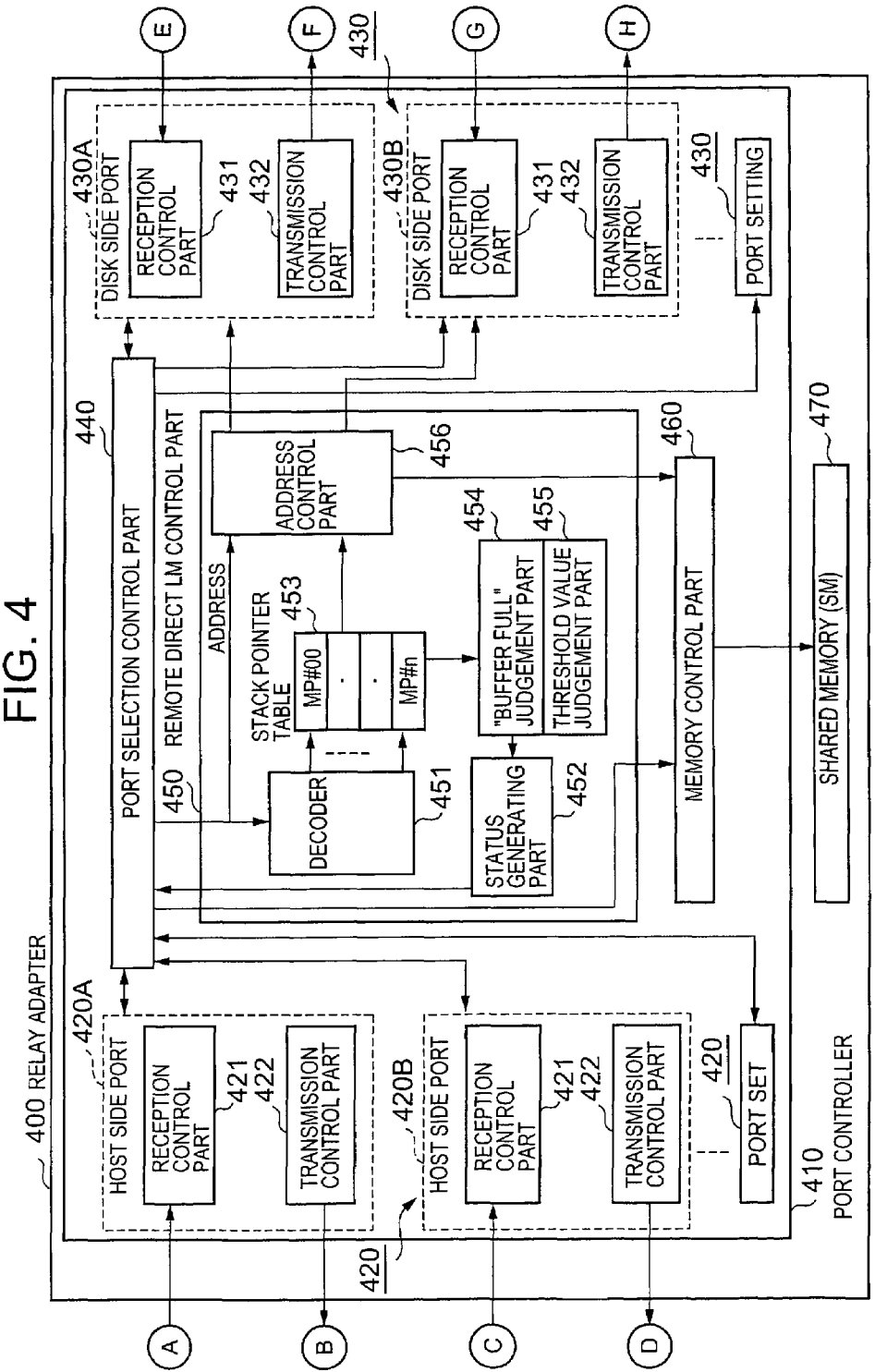
FIG. 4 is a block diagram which shows the function and construction of the relay adapter 400 in detail.
Figure 5:
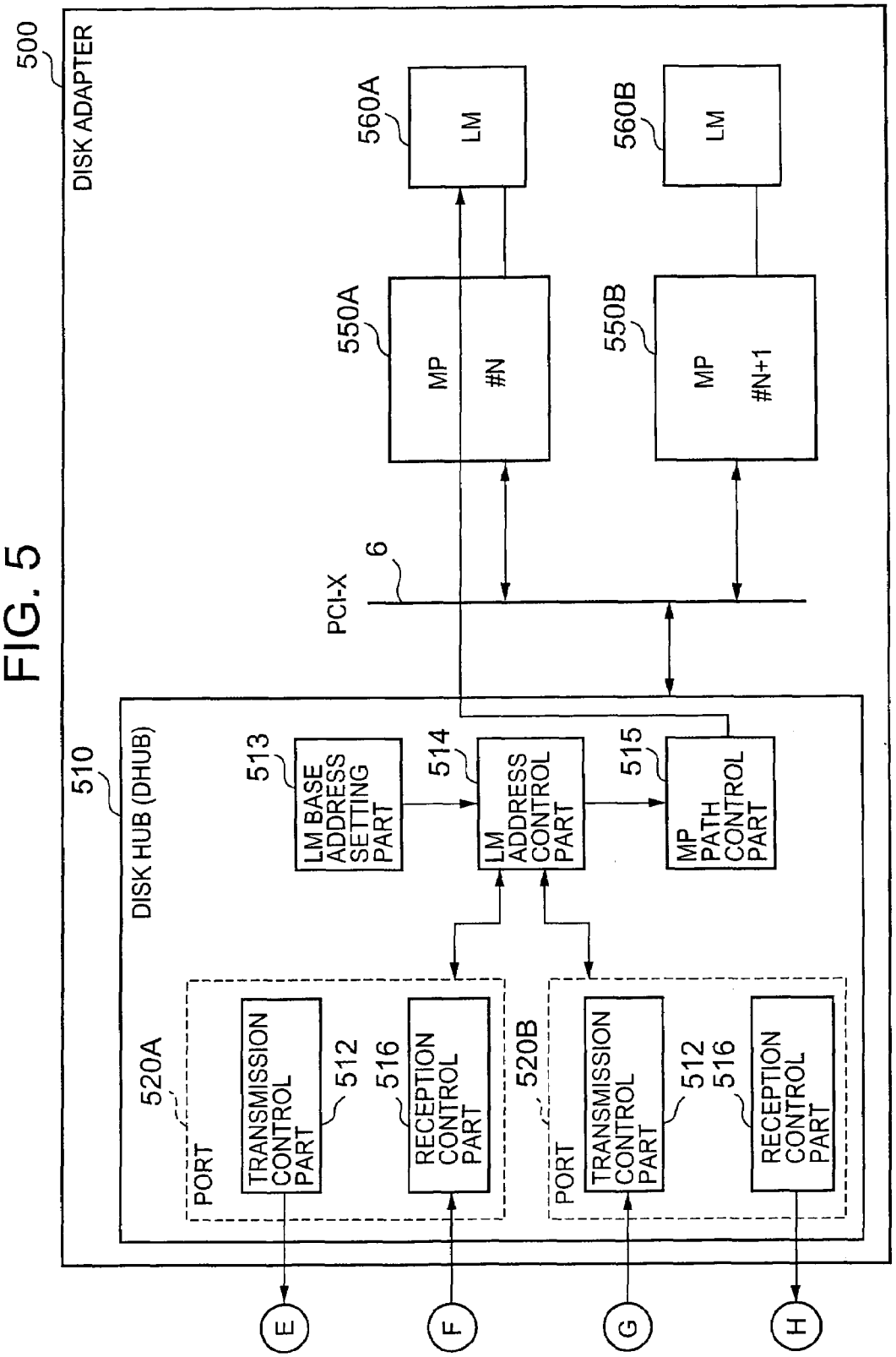
FIG. 5 is a block diagram which shows the function and construction of the disk adapter 500 in detail.

FIG. 3 is a block diagram which shows the function and construction of the host adapter 300 in detail. FIG. 4 is a block diagram which shows the function and construction of the relay adapter 400 in detail. FIG. 5 is a block diagram which shows the function and construction of the disk adapter 500 in detail. If FIGS. 3, 4 and 5 are viewed side by side, the connections of the adapters 300, 400 and 500 will be understood.

As is shown in FIG. 3, one or more (e. g., two) host side MPs 360A and 360B, and one or more (e. g., two) host side LMs 350A and 350B that respectively correspond to the one or more host side MPs 360A and 360B, are mounted in the host adapter 300. In the host adapter 300, the one or more host side MPs 360A and 360B, host side LMs 350A and 350B, and host hub 310, are connected via a specified processor bus (e. g., a PCI-X bus) 2 so that communication is possible. An MP path control part 311, an access control part 316, one or more (e. g., two) host ports 200A and 200B that respectively correspond to the one or more host side MPs 360A and 360B, a status judgement part 317, an SM buffer threshold value table 314, an SM buffer full table 315, an interrupt control part 313 and a reset control part 312 are provided in the host hub 310.

The MP path control part 311 receives commands (hereafter referred to as "direct write commands") that include LM addresses and messages, and commands (hereafter referred to as "indirect write commands") that include SM addresses and messages, from the host side MPs 360A and 360B, and transmits these commands to the access control part 316. Furthermore, when the MP path control part 311 receives rest commands (described later) from the host side MPs 360, the MP path control part 360 sends these reset commands to the reset control part 312.

The access control part 316 transfers write commands received from the MP path control part 311 to the host port 200A or 200B corresponding to the host side MP 360A or 360B that is the transmission source. In this case, the access control part 316 controls whether or not the commands received from the MP path control part 311 are transmitted to the host port 200A or 200B based on information written in the SM buffer threshold value table 314 and SM buffer full table 315. In concrete terms, for example, the access control part 316 transmits direct write commands from the host side MP 360A for which "buffer full" is not recorded in the SM buffer full table 315 to the host port 200A, but stops without transmitting direct write commands from the host side MP 360B for which "buffer full" is recorded to the host port 200B.

A transmission control part 318 and reception control part 319 are contained in each host port 200A and 200B.

The transmission control part 318 converts commands received from the access control part 316 into a specified format, and transmits these commands to the port controller 410 of the relay adapter 400. The commands following format conversion are as shown in FIG. 6. Specifically, the commands that are sent to the port controller 410 from the transmission control part 318 include address information, command type, write data and CRC. For example, the address information is an LM address or SM address. Furthermore, for example, the command types include "shared memory write" which indicates that a message is to be written into the shared memory, "shared memory read" which indicates that a message is to be read from the shared memory, and "LM write" which indicates that a message is to be directly written into an LM (furthermore, the data length of the message or the like may also be included). The write data is a message that is produced by the transmission source MP 360 or 550. CRC indicates a data verification code for this command format.

The reception control part 319 receives status information from the port controller 410, and transfers this information to the status judgement part 317. For example, this status information is as shown in FIG. 7. Specifically, various types of information are included in the status information; however, examples of the main types of information include destination MP information, "buffer full" information and "over buffer threshold value" information. For example, the destination MP information is discriminating information for the destination MP 550 of the message that is the cause of transmission of this status information. The "buffer full" information is information that indicates whether or not "buffer full" (in other words, for example, a serious warning; described later) has been generated in the sub-buffer region of the SM 470 corresponding to the destination MP 550. The "over buffer threshold value" information is information indicating whether or not "over buffer threshold value" (in other words, for example, a mild warning; described later) has been generated in the sub-buffer region of the SM 470 corresponding to the destination MP 550.

In the SM buffer threshold value table 314, it is recorded for each of the MPs 360 and 550 whether or not the accumulated quantity of direct write commands present in the corresponding sub-buffer region has exceeded a first threshold value (in other words, whether or not "over buffer threshold value" has been generated). In concrete terms, for example, when the first threshold value has not been exceeded in the sub-buffer region corresponding to a certain destination MP 550, the bit corresponding to this MP 550 in the SM buffer threshold value table 314 is "off", while when the first threshold value has been exceeded in this sub-buffer region, the bit corresponding to this MP 550 is switched "on" by the status judgement part 317. In this case, the interrupt control part 313 and access control part 316 are notified of this by the SM buffer threshold value table 314.

Furthermore, a threshold value registration representative bit is provided in the SM buffer threshold value table 314. This threshold value registration representative bit is "off" if all of the bits respectively corresponding to the MPs 360 and 550 are off; however, if the bit corresponding to at least one MP 360 or 550 is "on", this threshold value registration representative bit is "on".

In the SM buffer full table 315, it is recorded for each of the MPs 360 and 550 whether or not the accumulated quantity of direct write commands present in the corresponding sub-buffer region has exceeded a second threshold value that is greater than the first threshold value (in other words, whether or not a "buffer full" has been generated). In concrete terms, for example, when the second threshold value has not been exceeded in the sub-buffer region corresponding to a certain destination MP 550, the bit corresponding to this MP 550 in the SM buffer full table 315 is "off", and when the second threshold value is exceeded in this sub-buffer region, the bit corresponding to this MP 550 is switched "on" by the status judgement part 317. In this case, the interrupt control part 313 and access control part 316 are notified of this by the SM buffer full table 315.

A threshold value registration representative bit is provided in the SM buffer table 315. If all of the bits respectively corresponding to the MPs 360 and 550 are "off", the threshold value registration representative bit is "off"; however, if the bit corresponding to at least one MP 360 or 550 is "on", the threshold value registration representative bit is "on".

The status control part 317 updates the SM buffer threshold value table 314 and SM buffer full table 315 based on the destination MP information, "buffer full" information and "over buffer threshold value" information of the status information (see FIG. 7) received from the reception control part 319. In concrete terms, for example, if the "buffer full" information indicates "buffer full", the status control part 317 switches the bit in the SM buffer full table 315 for the MP 550 indicated by the destination MP information from "off" to "on". Similarly, for example, if the "over buffer threshold value" information indicates "over threshold value", the status judgement part 317 switches the bit in the SM buffer threshold value table 314 for the MP 550 indicated by the destination MP information from "off" to "on".

The interrupt control part 313 controls whether or not an interrupt signal is output to the respective MPs 360 based on information for each of the MPs 360 and 550 that is respectively recorded in the two types of tables 314 and 315, and controls the type of interrupt signal that is output when such an interrupt signal is output. In concrete terms, for example, when the interrupt control part 313 receives a notification from the SM buffer threshold value table 314 indicating that an "over threshold value" has been generated for a certain disk side MP 550, the interrupt control part 313 transmits a normal interrupt signal to the message transmission source MP in the host adapter 300 in which this interrupt control part 313 is mounted (or to all of the MPs) 360A and/or 360B. Furthermore, for example, when the interrupt control part 313 receives a notification from the SM buffer full table 315 indicating that a "buffer full" has been generated for a certain disk side MP 550, the interrupt control part transmits a trouble interrupt signal to the message transmission source MP in the host adapter 300 in which this interrupt control part 313 is mounted (or to all of the MPs) 360A and/or 360B. Furthermore, the micro-program of the MP 360A or 360B that has received a normal interrupt signal issues an "over threshold value" reset command that is used to reset the "over threshold value" for the abovementioned disk side MP 550 to the reset control part 312. Moreover, the micro-program of the MP 360 that has received a trouble interrupt signal reduces the frequency with which messages destined for the abovementioned disk side MP 550 are issued until a specified event occurs (e. g., until a notification of releasing the "buffer full" is received from the port controller 410), or else switches from the direct LM write system to the indirect LM write system and issues messages destined for the abovementioned disk side MP 550 until a specified event occurs (e. g., until a fixed time has elapsed following the execution of the indirect LM write system), whereupon the abovementioned micro-program issues messages to the abovementioned destination by the direct LM write system as usual.

The reset control part 312 receives "over threshold value" reset commands from the host side MPs 360 via the MP path control part 311, and switches the bits in the SM buffer threshold value table 314 for the MPs 550 (or 360) for which such commands have been received from "on" to "off" (i. e., releases the "over threshold value" state for these MPs 550). Furthermore, the reset control part 312 receives "buffer full" reset commands for certain MPs 550 (or 360) by a method that will be described later, and switches the bits in the SM buffer full table 315 for these MPs 550 (or 360) from "on" to "off" (i. e., releases the "buffer full" state for these MPs 550 (or 360)).

Next, the relay adapter 400 will be described with reference to FIG. 4.

As was described above, a port controller 410 and an SM 470 are provided in the relay adapter 400. One or more host side port sets 420 to which one or more host adapters 300 are respectively connected, one or more disk side port sets 430 to which one or more disk adapters 500 are respectively connected, and a port selection control part 440, are provided in the port controller 410. Furthermore, a remote direct LM write control part 450 and a memory control part 460 are provided in the port controller 410.

One or more (e. g., two) host side ports 420A and 420B to which one or more ports 200A and 200B of the respective host adapters 300 are respectively connected are provided in the host side port set 420. The host side ports 420A and 420B are communications interfaces that are used for communications with the host adapters 300. A reception control part 421 which receives format-converted commands from the transmission control parts 318 of the connection destination host ports 200A and 200B, and a transmission control part 422 which transmits status information prepared by a method described later to the reception control parts 319 of the connection destination host ports 200A and 200B, are provided in each of the host side ports 420A and 420B.

One or more (e. g., two) disk side ports 430A and 430B which are respectively connected to one or more disk ports 520A and 520B of the respective disk adapters 500 are provided in the disk side port set 430. The disk side ports 430A and 430B are communications interfaces that are used for communication with the disk adapters 500. A transmission control part 432 which transmits commands received from the host side port 420A or 420B via the port selection control part 440 to the reception control part of the connection destination disk port 520A or 520B, and a reception control part 431 which receives commands from the transmission control part of the connection destination disk port 520A or 520B, are provided in each of the disk side ports 430A and 430B. The format of the commands output by the transmission control part is (for example) as shown in FIG. 8. Specifically, these commands include address information (for example, an LM address), command type and write data (i. e., messages to the destination MP) that is to be written into the LM of the destination MP. Furthermore, for example, when the transmission control part 432 includes the LM address in the command that is transmitted, the upper N bits of this LM address may be excluded. In this case, for example, the LM address from which the upper N bits have been excluded is restored to the correct LM address using the base address of the LM 560 in the disk hub 510.

For example, when the port selection control part 440 receives a direct write command from the host adapter 300, the port selection control part 440 discriminates the disk side port 430 via which this command is to be sent from the LM address contained in the command. In this case, furthermore, the port selection control part 440 judges whether or not the discriminated disk side port 430 is in use (in concrete terms, for example, whether or not the disk side port 430A is currently engaged in transmitting or receiving a different command); if this disk side port 430A is not in use, the direct write command is transmitted to the disk adapter 500 via this port 430A, while if the port 430A is in use, the LM address of the direct write command is sent to the address decoder 451 in order to store the direct write command temporarily in the sub-buffer region of the SM 470, and the LM address and write data in the direct write command are transmitted as data to the memory control part 460. Furthermore, when the port 430A that was in use is no longer in use, the port selection control part 440 receives a read request from the port 430A, and specifies the port 430A that originated this read request, so that discriminating information for the destination MP of the message that is to be read (e. g., the number of the destination MP) is discriminated, and this discriminating information is sent to the address decoder 451.

Figure 9:
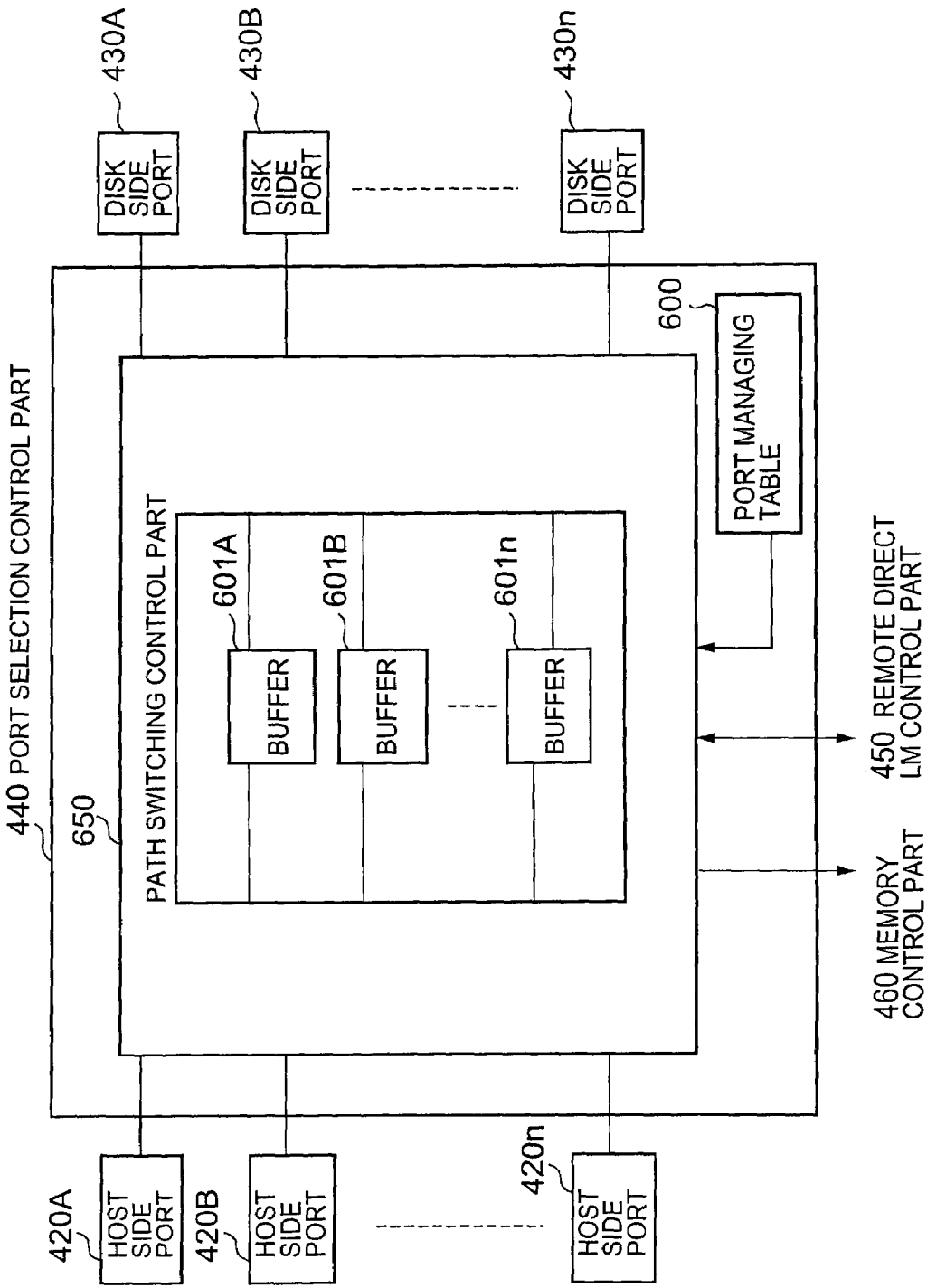
FIG. 9 shows an outline of the port selection control part 440.

FIG. 9 shows an outline of the port selection control part 440. The port selection control part 440 will be described in detail with reference to this figure.

The port selection control part 440 comprises one or more buffers 601A through 601n, a port managing table 600, and a path switching control part 650.

The one or more buffers 601A through 601n are buffers that respectively correspond to the one or more host side ports 420A through 420n (or one or more disk side ports 430A through 430n). In each of the buffers 601A through 601n, direct write commands that are received by the host side ports (or disk side ports) corresponding to these buffers are temporarily stored. In concrete terms, for example, direct write commands that are received by the host side port 420A from the host adapter 300, and direct write commands that are transferred to the host side port 420 from a certain disk side port, are stored in the buffer 601A.

Port control information relating to the ports to which direct write commands received by the abovementioned respective ports are to be transferred is registered for each of the one or more host side ports 420A through 420n and one or more disk side ports 430A through 430n in the port managing table 600. Fore example, the port control information includes one or more storage destination LM address ranges (and MP discriminating information) respective corresponding to the discriminating information for the one or more ports 430A through 430n and 420A through 420n.

The path switching control part 650 is a hardware circuit which is used to output direct write commands received from the respective ports 420A through 420n and 430A through 430n from different ports (this may also be software or a combination of hardware and software). For example, the path switching control part 650 may have any type of construction, as long as this path switching control part is capable of performing the following three types of processing (1) through (3):

(1) Processing which stores direct write commands received from the respective ports 420A through 420n and 430A through 430n in the buffers 601A through 601n corresponding to these ports.

(2) Processing which reads out direct write commands that are stored in the buffers, and outputs these direct write commands from the ports corresponding to the LM addressed contained in these commands.

(3) Processing which sends the LM addresses of the direct write commands to the address decoder 451 in order to store the direct write commands temporarily in the sub-buffer regions of the SM 470 if the output destination ports are in use, and which transmits the LM addresses and write data in the direct write commands as data to the memory control part 460. As a concrete example, for instance, the construction shown in FIG. 10 may be employed. Specifically, the path switching control part 650 may comprise one or more port path control parts 602A through 602n respectively corresponding to the one or more disk side ports 430A through 430n, and an SM path control part 603. Each of the one or more port path control parts 602A through 602n is a hardware device (e. g., a selector) which controls communications between the one or more buffers 601A through 601n, and the disk side port corresponding to this port path control part itself. The SM path control part 603 is a hardware device (e. g., a selector) which controls communications between the one or more buffers 601A through 601n, and the address decoder 451 and memory control part 460.

Figure 10:
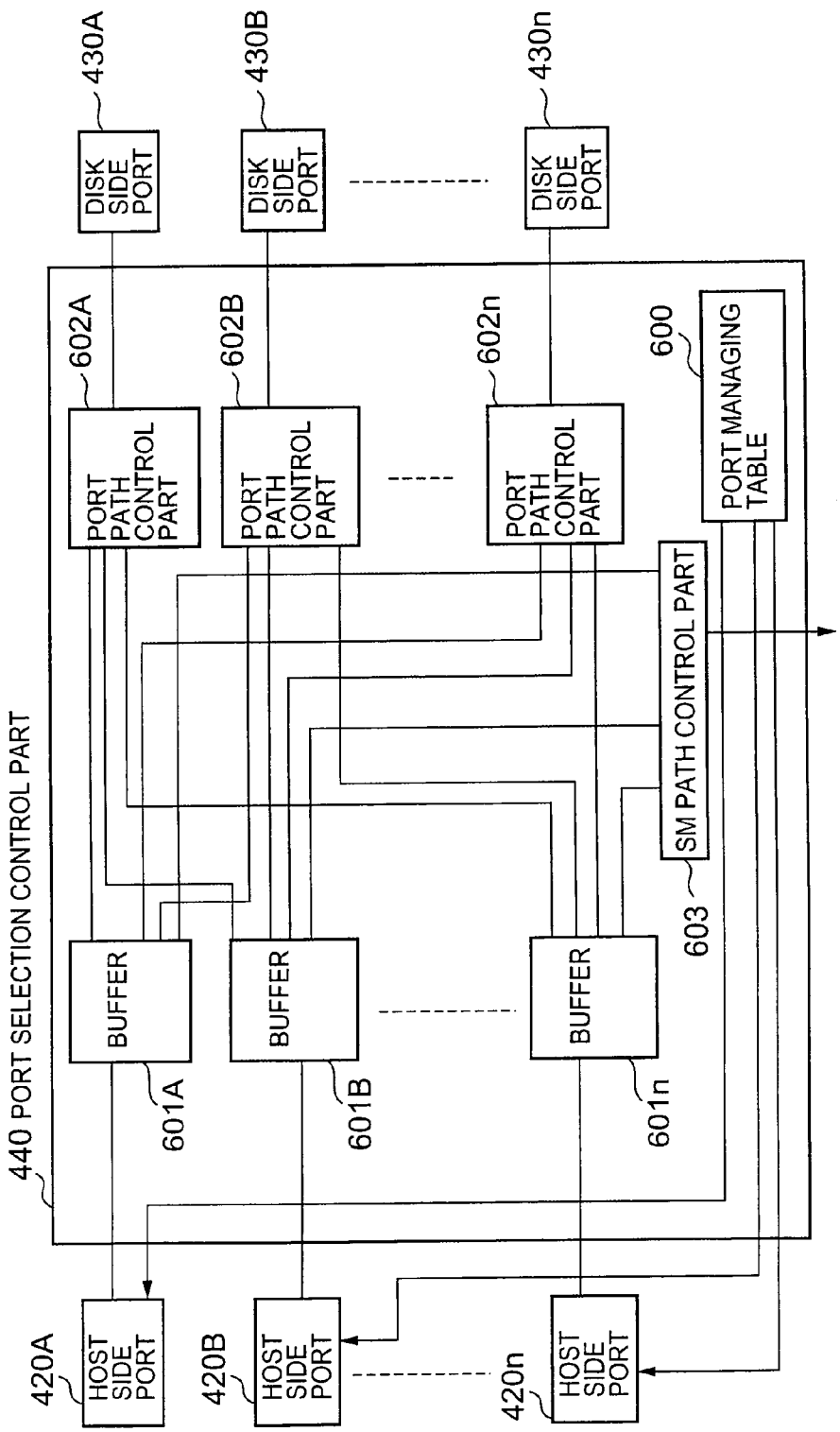
FIG. 10 shows a concrete example of the port selection control part 440.

For example, in the case of the construction shown in FIG. 10, the following processing is performed.

Discriminating information for the respective port path control parts 602A through 602n corresponding to the respective disk side ports 430A through 430n, as well as discriminating information for the SM path control part 603, is recorded in the port managing table 600. Accordingly, by referring to this table 600, the respective host side ports 420A through 420n can discriminate the port path control parts 602A through 602n with which arbitration is possible based on the LM addresses in the received direct write commands; furthermore, the SM path control part 603 can be discriminated, and arbitration with this control part is possible.

The host side port 420B stores received direct write commands in the buffer 601B, discriminates the port path control part 602A that is the object of arbitration based on the LM addresses in these commands and the port managing table 600, and arbitrates with this port path control part 602A.

As a result of arbitration, if the port path control part 602A is not in use (e. g., if this control part 602A is in a state in which direct write commands can be output from the control part 602A), the port path control part 602A reads out the direct write commands that have accumulated in the buffer 601B, and transmits these commands to the disk side port 430A.

On the other hand, as a result of the abovementioned arbitration, if the port path control part 602A is in use, the host side port 420B arbitrates with the SM path control part 603. As a result, the SM path control part 603 reads out the direct write commands accumulated in the buffer 601B, and transfers the LM addresses and write data in these commands as data to the memory control part 460; furthermore, the LM addresses in these commands are sent to the address decoder 451.

The above has been a description of the port control part 440. In the port control part 440, as was described above, buffers are interposed between the host side ports 420A through 420n and disk side ports 430A through 430n, and the direct write commands received by the respective ports 420A through 420n and 430A through 430n are temporarily accumulated in these buffers. Accordingly, if the respective ports 420A through 420n and 430A through 430n that have received direct write commands temporarily store these commands in specified buffers, subsequent separate commands can be received even if the abovementioned commands are not output from the specified ports meant for output. In other words, the host side ports 420A through 420n and disk side ports 430A through 430n can operate independently.

Reference is again made to FIG. 4.

The remote direct LM write control part 450 controls the storage of direct write commands in the sub-buffer regions of the SM 470. The remote direct LM write control part 450 comprises a stack pointer table 453, an address decoder 451, an address control part 456, a threshold value judgement part 455, a "buffer full" judgement part 454, and a status generating part 452.

Stack pointers are registered in the stack pointer table 453 for each of the respective MPs 550 (and/or 360) that are destinations of messages. These stack pointers indicate one or more sub-buffer regions respectively corresponding to one or more MPs in the abovementioned buffer region (region in which direct write commands are stored) of the SM 470. In concrete terms, for example, these stack pointers indicate the offset from the base address of the SM 470. The stack pointers for the respective destination MPs 550 include write pointers that indicate the write positions of commands, and read pointers that indicate the read positions of commands. When a write request for a certain destination MP 550 is received from the address decoder 451, the stack pointer table 453 increases the write pointer of this MP 550 by 1 increment; when a read request is received for this MP 550, the stack pointer table 453 decreases the read pointer and write pointer by 1 decrement. Then, the updated write pointer or read pointer, and the discriminating information for the MP 550 that was the object of pointer updating, are transmitted to the address control part 456, "buffer full" judgement part 454 and threshold value judgement part 455. In this embodiment, it can be judged from the values of the write pointers whether or not data is about to overflow in the respective sub-buffer regions.

The address decoder 451 stores a table (not shown in the figures) in which one or more sets of MP discriminating information respectively corresponding to one or more storage destination LM address ranges are recorded. When an LM address is sent from the port selection control part 440, the address decoder 451 discriminates the message destination MP 550 (or 360) from this LM address and the abovementioned table, selects the stack pointer that corresponds to the discriminated MP 550, and transmits a write request for this MP 550 to the stack pointer table 453. Furthermore, when destination MP discriminating information is received from the port selection control part 440, the address decoder 451 selects the stack pointer corresponding to the MP 550 that has this discriminating information, and transmits a read request for this MP 550 to the stack pointer table 453.

The address control part 456 has the function of setting SM addresses for the sub-buffer regions of the SM 470. In concrete terms, for example, the address control part 456 calculates SM write addresses indicating the locations in the SM 470 in which data is to be stored or SM read addresses indicating the locations in the SM 470 from which data is to be read based on the values of the write pointers or read pointers received from the stack pointer table 453 and the base address of the SM 470 that is set beforehand in the port controller 410. The address control part 456 sends the calculated SM write addresses or SM read addresses to the memory control part 460.

The threshold value judgement part 455 judges whether or not the stack pointers (write pointers) sent from the stack pointer table 453 have exceeded the first threshold value; if these pointers have exceeded the first threshold value, a notification of an occurrence of an "over threshold value", and discriminating information for the destination MP 550 in which this "over threshold value" has occurred, are transmitted to the status generating part 452.

The "buffer full" judgement part 454 judges whether or not the stack pointers (write pointers) sent from the stack pointer table 453 have exceeded a second threshold value that is greater than the first threshold value. If these pointers have exceeded this second threshold value, a notification of an occurrence of a "buffer full", and discriminating information for the destination MP 550 in which this "buffer full" has occurred, are transmitted to the status generating part 452. Furthermore, this second threshold value is a threshold value which is used to prevent the accumulated amount of data in the sub-buffer regions of the SM 470 from exceeding the memory capacity of these buffer regions, and is a value that is less than the capacity of these buffer regions, but close to this capacity. The first threshold value is a value that is smaller than this second threshold value by a specified amount.

When the status generating part 452 receives notification of an occurrence of an "over threshold value" and the discriminating information for the destination MP in which this has occurred from the threshold value judgement part 455, the status generating part 452 produces status information that includes this destination MP discriminating information and a code that indicates the occurrence of an "over threshold value". Furthermore, when the status generating part 452 receives notification of an occurrence of a "buffer full" and the discriminating information for the destination MP in which this has occurred from the "buffer full" judgement part 454, the status generating part 452 produces status information that includes this destination MP discriminating information and a code that indicates the occurrence of "buffer full". The status generating part 452 transmits the status information thus produced to specified MPs 360 or 550 (e. g., all of the MPs 360 or 550 or the host side MP 360 that is the transmission source of the message) via the port selection control part 440 and specified ports 420 (and/or 430). In concrete terms, for example, in a case where the status generating part 452 transmits this status information to the port selection control part 440, the port selection control part 440 outputs this status information from the host side port that received the direct write command that was the cause of the production of the status information. As a result, this status information is received by the host port that output the direct write command, and in the host adapter 300, the host side MP 360A or 360B to which an ordinary interrupt or trouble interrupt is to be issued is discriminated from this host port.

When the memory control part 460 receives an SM write address from the address control part 456, the memory control part 460 stores the data received from the port selection control part 440, i. e., the LM address and message, in this SM write address. As a result, this message and the LM address of this message are stored in the sub-buffer region of the SM 470 that corresponds to the destination MP 550 of this message. When the memory control part 460 receives an SM read address from the address control part 456, the memory control part 460 reads out the data that is in this SM read address (i. e., the LM address and message set that is stored in the sub-buffer region).

Next, the disk adapter 500 will be described in detail with reference to FIG. 5.

In the disk adapter 500, as is shown in FIG. 5, one or more (e. g., two) disk side MPs 550A and 550B, one or more disk side LMs 560A and 560B, and a disk hub 510, are connected via a specified processor bus (e. g., a PCI-X bus) 6 so that communication is possible. Disk ports 520A and 520B which are respectively connected to the disk side ports 430A and 430B of the relay adapter 400, an LM base address setting part 513, an LM address control part 514 and an MP path control part 515 are provided in the disk hub 510. A reception control part 516 and a transmission control part 512 are provided in each of the disk ports 520A and 520B.

The reception control part 516 receives commands in the format shown in FIG. 8 (i. e., commands containing an LM address and message) from the transmission control parts 432 of the disk side ports of the port controller 410, and sends these commands to the LM address control parts 514.

The LM base address setting part 513 is a memory device (e. g., a nonvolatile memory) that stores the base addresses of the respective LMs 560.

The LM address control part 514 calculates accurate LM addresses using the LM addresses received from the reception control part 516 and the base addresses stored by the LM base address setting part 513, and transfers these LM addresses and the messages received from the reception control part 516 to the MP path control part 515.

The MP path control part 515 reads the messages received from the LM address control part 514 into the LM address received from the LM address control part 514 via the processor bus 6.

The transmission control part 512 receives commands that are output from the disk side MP 550A, and outputs these commands to the relay adapter 400.

The above has been a description of the host adapter 300, relay adapter 400 and disk adapter 500.

Furthermore, in the above description, a case in which messages for the disk side MPs 550 were issued by the host side MPs 360 was taken as an example; however, since there may also be cases in which the disk side MPs 550 issue messages for the host side MPs 360, the host hub 310 and disk hub 510 have both the function and construction of the abovementioned host hub 310 and the function and construction of the abovementioned disk hub 510. Specifically, for example, the host hub 310 comprises an LM address control part 514 and the like similar to the parts of the disk hub 510, and the disk hub 510 comprises an interrupt control part 313 and the like similar to the parts of the host hub 310.

Furthermore, in the above description, a case in which the host side MPs 360 issued messages for the disk side MPs 550 was taken as an example. However, the host side MPs 360 may also issues messages to host side MPs 360 other than themselves; similarly, the disk side MPs 550 may also issue messages to disk side MPs 550 other than themselves. In such cases, furthermore, the messages may be exchanged via the port controller 410 of the relay adapter 400.

The flow of the data processing that is performed among the abovementioned host adapter 300, relay adapter 400 and disk adapter 500 will be described below.

In the present embodiment, when the respective MPs 360 and 550 issue messages for other MPs 550 and 360, these messages are transmitted as a rule by the direct LM write system (in other words, commands that have LM addresses, the command type "LM write" and messages are issued). Below, the flow of the exchange of data that is performed by the adapters 300, 400 and 500 will be described with the host side MP 360A taken as the message transmission source MP, and the disk side MP 550A taken as the message destination MP.

(1) First case: a case in which messages are transmitted by the direct LM write system, and these messages are not temporarily stored in the sub-buffer regions of the SM 470.

Figure 11:
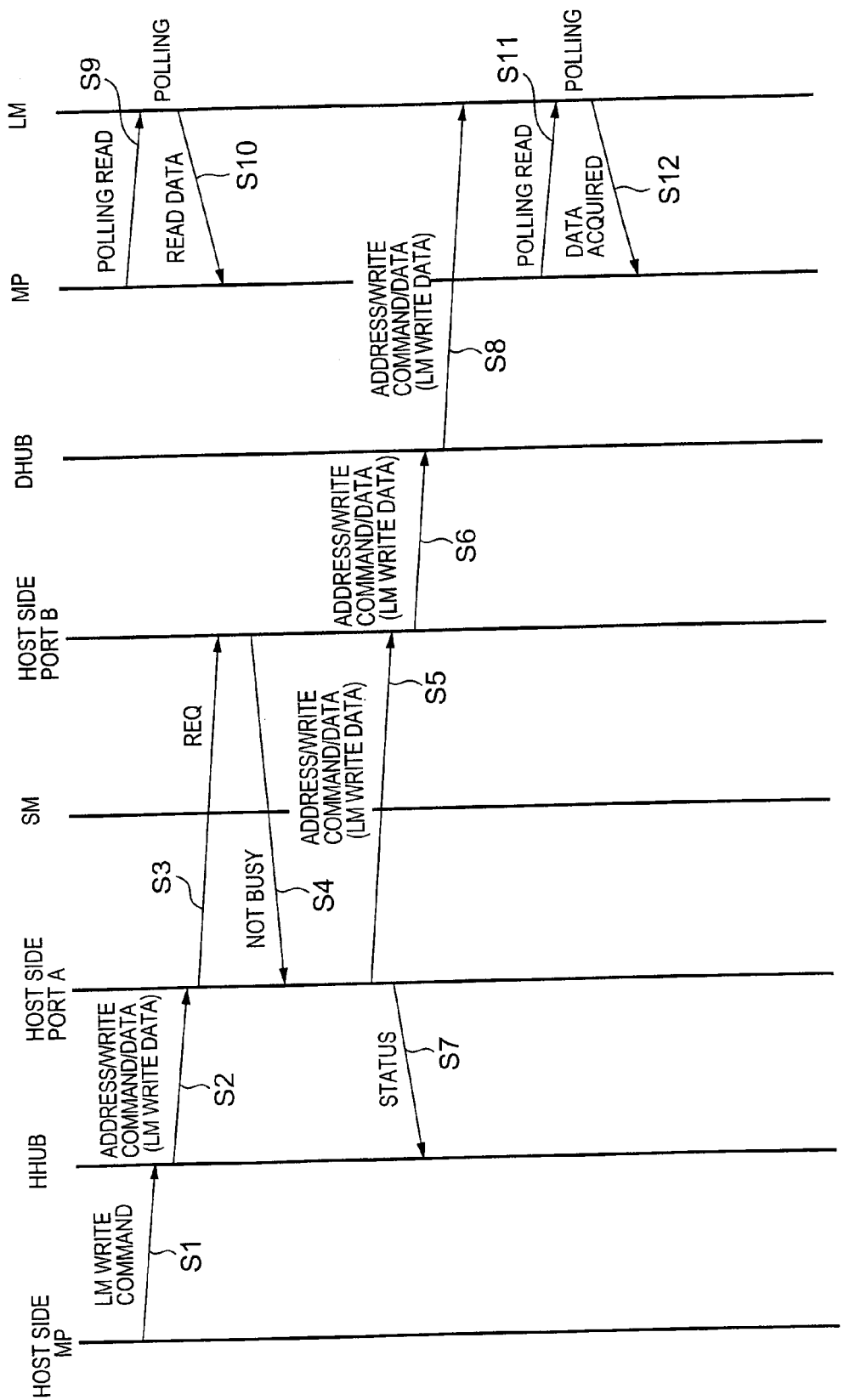
FIG. 11 shows the flow of the exchange of data performed by the adapters 300, 400 and 500 in a case where a message of the direct LM write system is transmitted, and this message is not temporarily stored in the sub-buffer region of the SM 470.

The flow of the exchange of data that is performed by the adapters 300, 400 and 500 in this first case is shown in FIG. 11. The flow for this first case will be described below with reference to FIG. 11, FIGS. 3 through 5 and FIG. 9.

The host side MP 360A acquires the LM address corresponding to the destination MP, which is the message storage destination LM address, from the address map 4 that is stored by this host side MP 360A itself, and outputs a write command that contains the acquired LM address and the message that is to be written into this address to the MP bus 2 (step S1). Accordingly, this write command is transmitted to the transmission control part 318 of the host port 200A corresponding to the MP 360A itself via the MP path control part 311 and access control part 316. The transmission control part 318 converts this command into a specified format, and transmits the command following this format conversion (i. e., a command containing an LM address, the command type "direct LM write" and a message) to the reception control part 421 belonging to the host side port 420A that is the connection destination of the host port 200A (S2).

The reception control part 421 belonging to the host side port 420A of the port controller 410 temporarily stored the command received from the transmission control part 318 of the host port 200A in a specified buffer 601A of the port selection control part 440. Furthermore, this reception control part 421 discriminates which of the disk side ports 430A through 430n is to be used based on the LM address contained in this command, and the port managing table 600, and transmits a specified request signal to the discriminated target port 430A (i. e., the disk side port corresponding to the storage destination LM address) (S3). When the host side port 420A receives (in response to this request signal) a signal (shown as "not busy" in the figures) from the target port 430A (or port path control part 602A corresponding to this target port 430A) indicating that the target port 430 is not in use (S4), the command in the buffer 601A is read out and transferred to the disk adapter 500 via the transmission control part 432 of the target port 430A (S5, S6). Furthermore, the transmission control part 442 of the host side port 420A transmits a notification indicating that this command transfer has been completed to the reception control part 319 of the connection destination host port 200A (as a results, the fact that the transfer of the output command has been completed can be confirmed in the host adapter 300) (S7).

The reception control part 516 of the disk port 520A that has received the command from the relay adapter 400 sends this command (i. e., a command containing an LM address and message) to the LM address control part 514.

The LM address control part 514 calculates the accurate LM address using the LM address received from the reception control part 516 and the base address stored by the LM base address setting part 513, and transfers this LM address and the message received from the reception control part 516 to the MP path control part 515.

The MP path control part 515 writes the message received from the LM address control part 514 into the LM address (received from the LM address control part 514) via the processor bus 6 (S8).

Based on the "own MP LM address information" in the address map stored by the disk side MP 550 itself, the disk side MP 550 polls the LM address corresponding to the corresponding to the transmission source MP 360 in its own LM 560 (i. e., periodically reads this LM address (S9, S10). In this case, if there is a message in this LM address, the disk side MP 550 acquires the message from this LM address (S11, S12).

As a result of the above series of flows, messages issued by the host side MPs 360 are directly written into the disk side LMs 560, and these directly written messages are transmitted to the disk side MPs 550.

(2) Second case: a case in which messages are transmitted by the direct LM write system, and these messages are temporarily stored in the sub-buffer regions of the SM 470.

Figure 12:
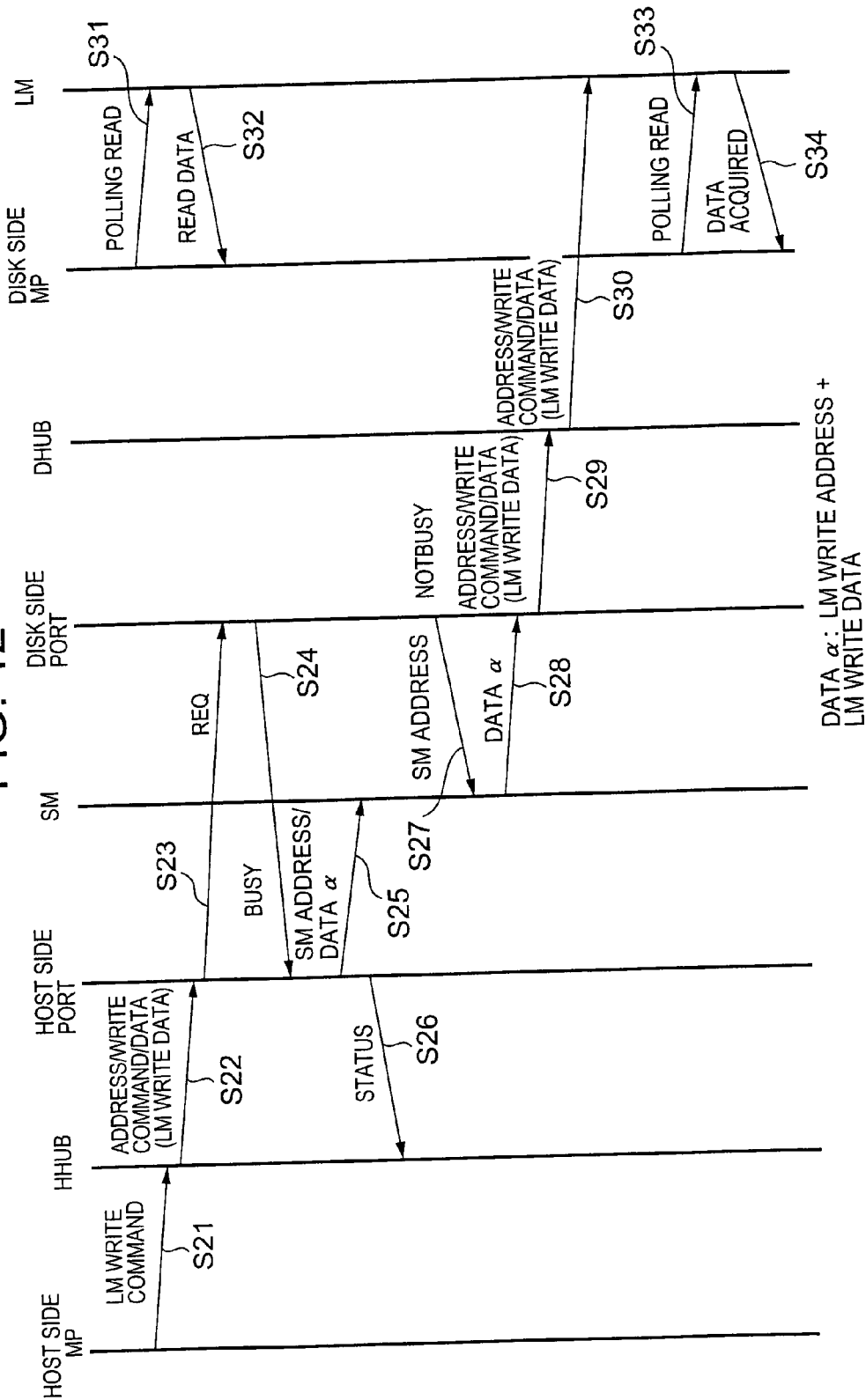
FIG. 12 shows the flow of the exchange of data performed by the adapters 300, 400 and 500 in a case where a message of the direct LM write system is transmitted, and this message is temporarily stored in the sub-buffer region of the SM 470.

The flow of the exchange of data that is performed by the adapters 300, 400 and 500 in this second case is shown in FIG. 12. The flow for this second case will be described below with reference to FIG. 12, FIGS. 3 through 5 and FIG. 9.

In a flow similar to that of the abovementioned first case, the reception control part 421 of the host side port 420A receives a direct write command (S21, S22), temporarily stores this command in a specified buffer 601A, discriminates the target port 430A based on the LM address contained in this command and the port managing table 600, and transmits a specified request signal to the target port 430A (S23). when the host side port 420A receives (in response to this request signal) a signal (shown as "busy" in the figures) from the target port 430A indicating that the target port 430A is in use (S24), the path switching control part 650 sends the LM address in the received command to the address decoder 451, and transmits the message and LM address contained in the received command to the memory control part 460 as data α (S25). Subsequently, the host side port 420A sends a notification of completion of the command transfer to the reception control part 319 of the host port 200A (S26).

When the LM address is sent to the address decoder 451 from the port selection control part 440, the address decoder 451 discriminates the destination MP 550 of the message from this LM address, selects the stack pointer corresponding to the discriminated MP 550, and transmits a write request for this MP 550 to the stack pointer table 453.

When the stack pointer table 453 receives a write request for a certain destination MP 550 from the address decoder 451, the stack pointer table 453 increases the write pointer of this MP 550 by one increment, and transmits the updated value of the write pointer and the discriminating information for the MP 550 that was the object of pointer updating to the address control part 456, "buffer full" judgement part 454 and threshold value judgement part 455.

Based on the value of the write pointer that is received from the stack pointer table 453 and the base address of the SM 470 that is set beforehand in the port controller 410, the address control part 456 calculates the SM write address that indicates the location in the SM 470 in which data is to be stored. The address control part 456 sends the calculated SM write address to the memory control part 460.

When the memory control part 460 receives such an SM write address from the address control part 456, the memory control part 460 stores the data α received from the port selection control part 440, i. e., the LM address and message, in this SM write address.

Subsequently, when the target port 430A is no longer in use, a read request for the data a that contains the message stored in the sub-buffer region of the SM 470 (i. e., the command shown in FIG. 11) is automatically issued to the port selection control part 440, or is issued in response to a period inquiry from the port selection control part 440.

The path switching control part 650 of the port selection control part 440 ascertains the MP discriminating information for the destination disk side MP 550 corresponding to this port 430A from the port 430A that originated the read request and the port managing table 600, and sends this MP discriminating information to the address decoder 451.

When the address decoder 451 receives such MP discriminating information from the port selection control part 440, the address decoder 451 selects the stack pointer that corresponds to the MP 550 that has this discriminating information, and transmits a read request for this MP 550 to the stack pointer table 453.

When the stack pointer table 453 receives the read request for transmission input shaft MP 550, the stack pointer table 453 decreases the read pointer and write pointer by one decrement, and transmits the updated pointer value and the discriminating information for the MP 550 that was the object of pointer updating to the address control part 456, "buffer full" judgement part 454 and threshold value judgement part 455.

Based on the value of the read pointer received from the stack pointer table 453 and the base address of the SM 470 that is set beforehand in the port controller 410, the address control part 456 calculates the SM read address that indicates the location in the SM 470 form which data is to be read. The address control part 456 sends the calculated SM read address to the memory control part 460 (S27).

When the memory control part 460 receives this SM read address from the address control part 456, the memory control part 460 reads out the data α (i. e., set of LM address and message stored in the sub-buffer region) that is present in this SM read address (S28), and transfers this data to the target port 430A that originated the abovementioned read request via the port selection control part 440. As a result, this data α is converted to a specified format (e. g., is converted into a command that contains an LM address, "LM write" as the command type, and write data) by the transmission control part 432 of the target port 430A, and is transmitted to the reception control part 516 of the disk port 520A (S29, S30).

Subsequently, in a flow similar to that of the abovementioned case 1, the message addressed to the disk side MP 550A is written into the LM 560A of this MP 550A without the interposition of this MP 550A, and the MP 550A can acquire the message addressed to itself by polling its own LM 560A (S31 through S34).

Furthermore, in this flow, each time that the value of the write pointer of the stack pointer table 453 is updated, the updated value of the write pointer is sent to the threshold value judgement part 455 and "buffer full" judgement part 454.

The threshold value judgement part 455 judges whether or not the value of the write pointer sent from the stack pointer table 453 has exceeded the first threshold value. If this value has exceeded the first threshold value, the threshold value judgement part 455 transmits an indication that an "over threshold value" has occurred, and discriminating information for the destination MP 550A in which this has occurred, to the status generating part 452.

The "buffer full" judgement part 454 judges whether or not the write pointer sent from the stack pointer table 453 has exceeded a second threshold value that is greater than the first threshold value. If this value has exceeded this second threshold value, the "buffer full" judgement part transmits an indication that "buffer full" has occurred, and discriminating information for the MP 550A in which this has occurred, to the status generating part 452.

When the status generating part 452 receives a notification of an occurrence of an "over threshold value", and the discriminating information for the MP 550A in which this has occurred, from the threshold value judgement part 455, the status generating part 452 produces status information that includes the MP discriminating information and a code which indicates that an "over threshold value" has occurred. Furthermore, when the status generating part 452 receives a notification of an occurrence of a "buffer full", and the discriminating information for the MP 550A in which this has occurred, from the "buffer full" judgement part 454, the status generating part 452 produces status information that includes the MP discriminating information and a code which indicates that "buffer full" has occurred. The status generating part 452 transmits the status information thus produced to specified MPs 360 or 550 (e. g., to all of the host side MPs 360 or to the host side MP 360A that is the transmission source of the message) via the port selection control part 440 and specified ports 420 (and/or 430).

The reception control part 319 of the port that has received the status information, e. g., the host port 200A, transfers the received status information to the status judgement part 317.

Based on the destination MP information, "buffer full" information and "over threshold value" information in the status information received from the reception control part 319, the status judgement part 317 updates the SM buffer threshold value table 314 and the SM buffer full table 315. In concrete terms, for example, if the "buffer full" information indicates "buffer full", the status judgement part 317 switches the bit in the SM buffer full table 315 for the MP 550A indicated by the destination MP information from "off" to "on". Similarly, for example, if the "over buffer threshold value" information indicates "over buffer threshold value", the status judgement part 317 switches the bit in the SM buffer threshold value table 314 for the MP 550A indicated by the destination MP information from "off" to "on".

When the bit in the SM buffer threshold value table 314 corresponding to a certain MP 550A is switched "on", the SM buffer threshold value table 314 notifies the interrupt control part 313 and access control part 316 of this fact. Furthermore, when the bit in the SM buffer full table 315 corresponding to a certain MP 550A is switched "on", the SM buffer full table 315 notifies the interrupt control part 313 and access control part 316 of this fact.

When the interrupt control part 313 receives notification from the SM buffer threshold value table 314 that an "over threshold value" has occurred for a certain disk side MP 550A, the interrupt control part 313 transmits a normal interrupt signal to all of the MPs 360 (or to only the MP 360A that is the transmission source of the message) located in the host adapter 300 in which this interrupt control part 313 is mounted. Furthermore, when the interrupt control part 313 receives notification from the SM buffer full table 315 that "buffer full" has occurred for a certain disk side MP 550A, the interrupt control part 313 transmits a trouble interrupt signal to all of the MPs 360 (or to only the MP 360A that is the transmission source of the message) located in the host adapter 300 in which this interrupt control part 313 is mounted.

The micro-program of the MP 360A that has received a normal interrupt signal issues an "over threshold value" reset command that is used to reset the "over threshold value" for the abovementioned disk side MPs 550 to the reset control part 312. In this case, in response to this "over threshold value" reset command, the reset control part 312 switches the bit in the SM threshold value table 314 for the MP 550 for which this command was received from "on" to "off" (i. e., the reset control part 312 releases the "over threshold value" state for this MP 550). The SM buffer threshold value table 314 sends an indication that the bit has been reset from "on" to "off", and MP discriminating information for the MP that was the object of this resetting, to the access control part 316. As a result, even if messages are transmitted from respective MPs 360 to the destination MP 550A in which an "over threshold value" has occurred, these messages are transmitted to the relay adapter via the access control part 316. Furthermore, the system may also be devised so that when the MP 360A receives a normal interrupt signal, the quantity of messages issued for the MP 550A in which an "over threshold value" has occurred, or the frequency with which such messages are issued, is reduced.

The micro-program of the MP 360 that has received a trouble interrupt signal reduces the frequency with which messages are issued to the abovementioned disk side MP 550A, or the quantity of such messages that are issued, until a specified event occurs (e. g., until notification of releasing the "buffer full" is received from the port controller 410); alternatively, the micro-program switches from the direct LM write system to the indirect LM write system, and issues messages destined for the abovementioned disk side MP 550A, and then issues messages to this destination by the direct LM write system in the ordinary manner after a specified event occurs (the micro-program may also issue messages by the direct LM write system in the ordinary manner, and the access control part 316 may prevent these messages from passing through to the relay adapter 400).

Furthermore, when "buffer full" is registered in the SM buffer full table 315, this "buffer full" is released (for example) by the following method.

Specifically, when the value of the updated write pointer received from the stack pointer table 453 reaches a third threshold value that is smaller by a specified amount than the second threshold value used as a reference for "buffer full", the "buffer full" judgement part 454 notifies the status generating part 452 of this fact, and the status generating part 452 transmits status information that includes a code which indicates "buffer full" release and discriminating information for the MP that is the object of this "buffer full" release. This status information is received by the status judgement part 317 of the host hub 310 via a specified route, and the status judgement part 317 notifies the reset control part 312 of the content of this status information. The reset control part 312 specifies discriminating information for the MP that is the object of "buffer full" release from the content of the abovementioned notification, and releases the "buffer full" for this MP by resetting the bit in the SM buffer full table 315 for this MP from "on" to "off". The SM buffer full table 315 sends a notification indicating that the bit was reset from "on" to "off", and discriminating information for the MP that was the object of this resetting, to the access control part 316. As a result, for example, in a case where messages destined for the MP 550 in which "buffer full" had occurred were stopped in the access control part 316, this stopping is released, so that the messages destined for this MP 550 are transmitted to the relay adapter via the access control part 316.

Furthermore, when the abovementioned "buffer full" is reset by the SM buffer full table 315, the interrupt control part 313 may be notified of this fact, and interrupt signals of a type corresponding to the resetting of "buffer full" may be transmitted to the respective host side MPs 360 from the interrupt control part 313. In this case, if the host side MPs 360 that receive this interrupt signal had been transmitting messages destined for the MP 550 in which the abovementioned "buffer full" occurred according to the indirect LM write system (i. e., the shared memory system), this transmission may be stopped, and the system may be returned to the transmission of messages to this MP 550 according to the direct LM write system.

Concrete examples of these cases will be described below.

Figure 13:
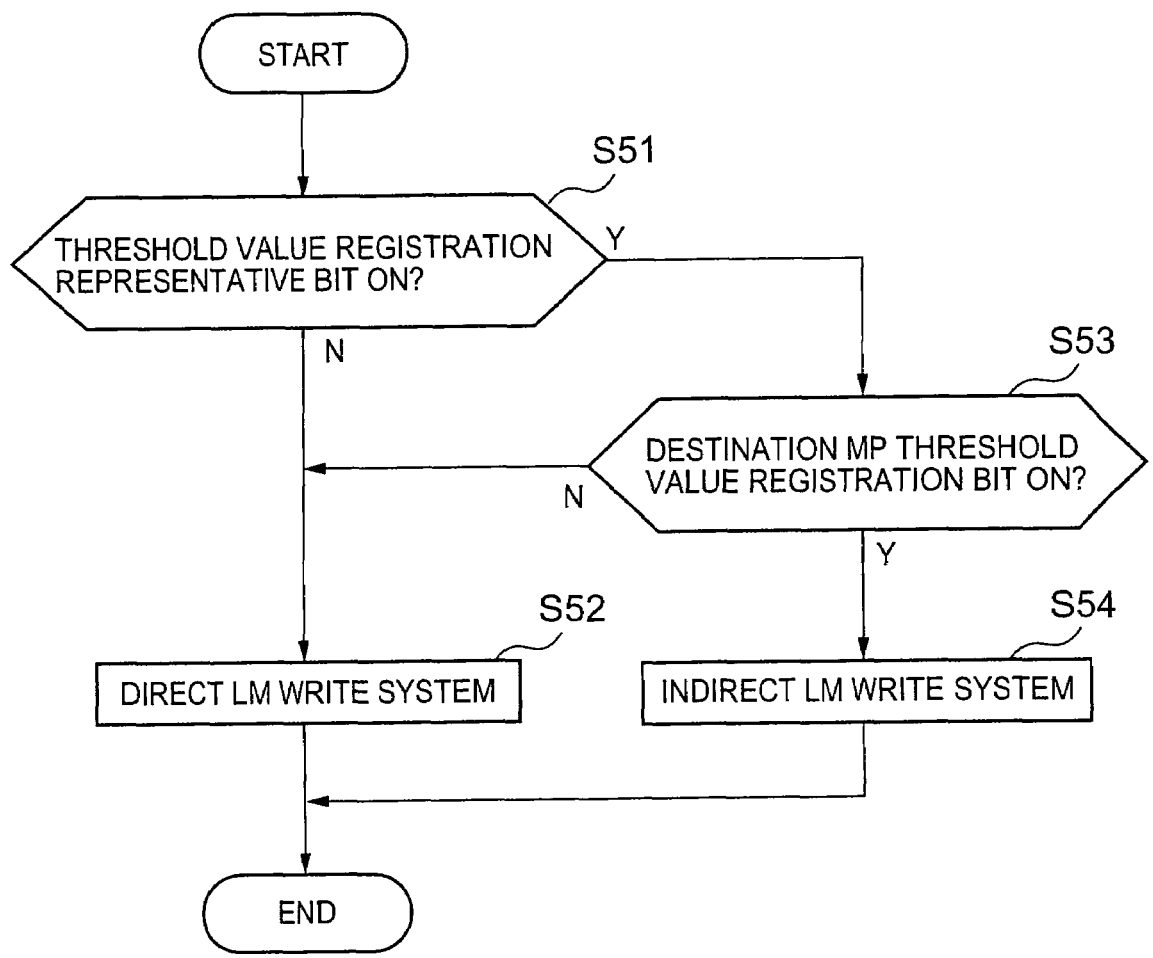
FIG. 13 shows the processing flow in a case where the access control part 316 controls the transmission of commands based on information in the SM buffer full table 315.

FIG. 13 shows the processing flow in a case where the access control part 316 controls the transmission of commands based on information from the SM buffer full table 315.

The access control part 316 of the host adapter 300 refers to the threshold value registration representative bit in the SM buffer full table 315, and judges whether this bit is "on" or "off" (S51).

If the threshold value registration representative bit is "off" as a result of S51 (N in S51), this means that no "buffer full" has occurred for any destination MP, and that "buffer full" will not occur regardless of the sub-buffer region in the SM 470 in which direct write commands are accumulated. Accordingly, the access control part 316 arranges the system so that direct write commands are transmitted.

On the other hand, if the threshold value registration representative bit is "on" as a result of S51 (Y in S51), this means that "buffer full" has occurred for at least one destination MP; accordingly, the access control part 316 judges whether the bit corresponding to the command destination MP is "on" or "off" in the SM buffer full table 315 (S53). If this bit is "off" as a result of S53, the access control part 316 arranges the system so that direct write commands are transmitted (S52); on the other hand, if this bit is "on", the access control part 316 arranges the system so that indirect write commands are transmitted (e. g., for the command transmission source MP 360A, indirect commands in which the LM address of the command is changed to an SM address are transmitted) (S54).

Figure 14:
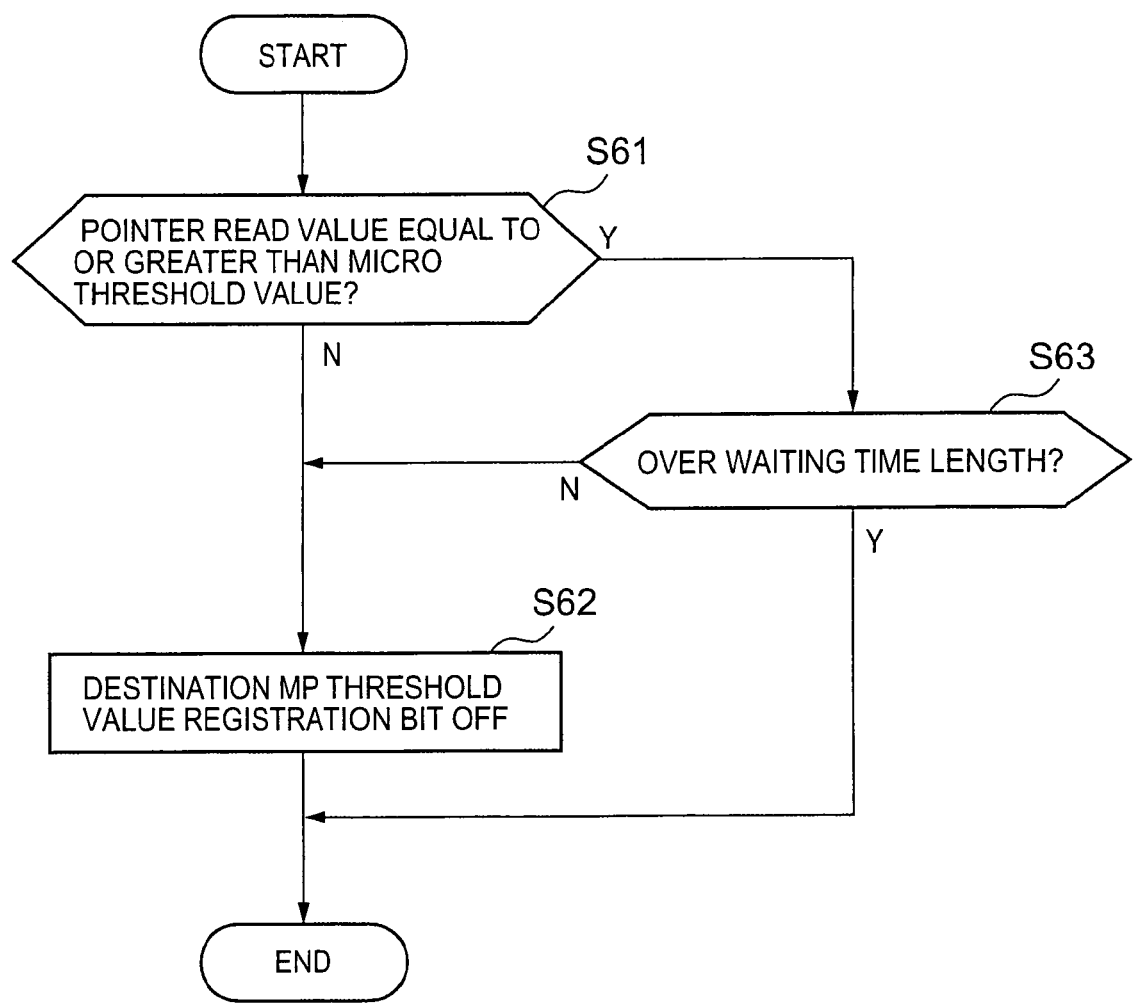
FIG. 14 shows the processing flow in a case where buffer full is reset in the SM buffer full table 315.

FIG. 14 shows the processing flow in a case where the "buffer full" is reset by the SM buffer full table 315.

The "buffer full" judgement part 454 of the relay adapter 400 periodically reads the write pointers of MPs in a "buffer full" state (S61).

If it is found as a result of S61 that the write pointer is not equal to or greater than a third threshold value that is smaller by a specified amount than the second threshold value used as a reference for "buffer full" (N in S61), the "buffer full" judgement part 454 notifies the status generating part 452 of the release of "buffer full". As a result, the abovementioned processing is performed so that the bit that was "on" because of "buffer full" is switched "off" in the SM buffer full table 315 in the host adapter 300 (S62).

On the other hand, even if the write pointer that is read is found to be equal to or greater than the abovementioned third threshold value as a result of S61, when a fixed time length has elapsed since the occurrence of "buffer full" (Y in S63), the "buffer full" judgement part 454 notifies the status generating part 452 of the release of "buffer full"; as a result, the bit that was "on" because of "buffer full" is switched "off" (S62).

Thus, in the abovementioned first embodiment, messages issued by a transmission side MP are directly written into the LM of a reception side MP without the interposition of this reception side MP. The reception side MP acquires messages addressed to itself by polling its own LM. The length of time required in order to read the LM is short compared to the length of time required in order to read the SM 470 (e. g., about 1/10 or less). Accordingly, the reception side MP can acquire messages output from the transmission side MP with little burden.

In concrete terms, for example, if the frequency with which the shared memory of the respective MPs is polled is set at once every 5 μsec, and the number of paths of the common memory is 32, then, if there are 32 MPs, the burden on the respective MPs and common memory is large, thus leading to a drop in the performance of the system. In this case, the path (individual part) access time between the respective MPs and the common memory control part is 800 nsec, and the access time between the common memory control part and the common memory (common part) is 200 nsec; accordingly, the time required for saturation of the individual paths is 800 nsec+200 nsec×32 MPs=7200 nsec. If the respective MPs poll the common memory at intervals of 7200 nsec or less, the paths become saturated, so that the access time is abruptly lengthened, thus causing a great deterioration in the performance of the system.

In the abovementioned first embodiment, this burden is alleviated, so that a disk array control device 100 with a high processing speed can be provided.

Furthermore, in the abovementioned first embodiment, the disk adapter 400 comprises an SM 470, and a buffer region is provided in this SM 470. Depending on the conditions of use of the port corresponding to the reception side adapter, messages sent by the direct LM write system are transferred to this adapter without being stored in the abovementioned buffer region, or are transferred after being temporarily stored in this buffer region. Specifically, when the messages that are the object of transmission are messages that are sent by the direct LM write system, a first transfer mode in which the messages are transferred to the reception side adapter via the buffer region of the SM 470, or a second transfer mode in which the messages are directly transferred without passing through this buffer region, is selectively executed in accordance with the conditions of use of the port corresponding to the reception side adapter. As a result, the transfer efficiency of messages between the transmission side MPs (e. g., the host side MPs 360) and the reception side MPs (e. g., the disk side MPs 550) is improved.

Furthermore, in the abovementioned first embodiment, when messages are transferred via the relay adapter 400, the host side ports 420 and disk side ports 430 can operate independently. For example, even if a message that is to be transmitted via a certain target disk side port 430 is being received by a certain host side port 420, there is no need for this target disk side port 430 to maintain a state of communications with respect to the disk hub 510. As a result, the transfer efficiency of messages between the transmission side MPs (e. g. the host side MPs 360) and the reception side MPs (e. g., the disk side MPs 550) is improved.

Furthermore, in the first embodiment, several modifications such as those described below are conceivable.

For example, the respective MPs 360 may also transmit commands that contain both an SM address and an LM address to the access control part 316. In this case, the system may be devised so that if the address control part 316 selects the direct LM write system based on the information in the respective tables 314 and 315, new commands in which the SM addresses are deleted from the received commands are produced and output, while if the indirect LM write system is selected, commands in which the LM addresses are deleted from the abovementioned received commands (or are allowed to remain without being deleted) are output.

Furthermore, for example, each of the host side ports 420A through 420n and disk side ports 430A through 430n may be caused to correspond to destination MP discriminating information instead of or in addition to LM address ranges, and this correspondence relationship may be registered in the port managing table 600. Furthermore, destination MP discriminating information that can be ascertained from the address maps 4 stored by the respective MPs may be included in the direct write commands and indirect write commands. Specifically, in the relay adapter 400, when received commands are transferred, the port meant for output may be selected from the destination MP discriminating information contained in the commands.

Furthermore, for example, one or more ports in the respective adapters 300, 400 and/or 500 may be physically separated, or may be logically separated even if not physically separated. Similarly, the transmission control part and reception control part located in the same port may be physically separated, or may be logically separated even if not physically separated.

Embodiment 2

In the abovementioned first embodiment, command transfer is performed using a relay part master system in which the relay adapter that transfers the commands is the master, and the reception side adapter (e. g., the disk adapter 500) that receives the commands is the slave. However, in the second embodiment that will be described below, command transfer is performed by a reception side master system in which the relay adapter is the slave, and the reception side adapter is the master. This will be described in detail below.

Figure 15:
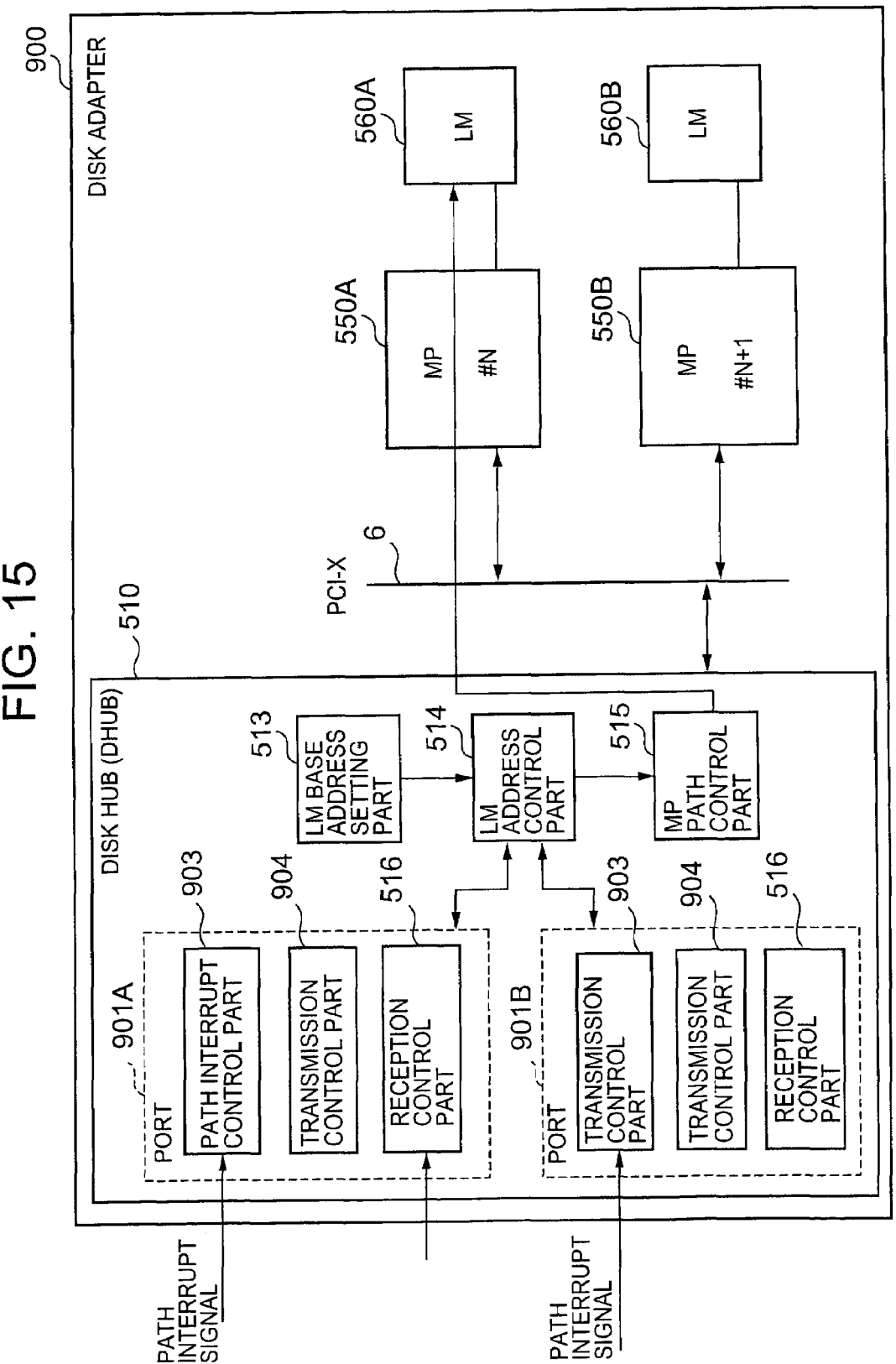
FIG. 15 shows an example of the construction of the disk adapter in a second embodiment of the present invention.

FIG. 15 shows an example of the construction of the disk adapter in this second embodiment of the present invention. Furthermore, in this figure, parts that have the same function as in the disk adapter 500 shown in FIG. 5 are labeled with the same reference numbers. Furthermore, in the following description, the description of parts that duplicate the first embodiment will be abbreviated or omitted.

A path interrupt control part 903 which receives path interrupt signals from the relay adapter is provided in the respective disk ports 901A and 901B of the disk adapter 900 in this second embodiment.

When the path interrupt control part 903 detects the fall (or rise) of a path interrupt signal, the path interrupt control part 903 notifies the transmission control part 904 in the same port 901A or 901B that there is a path interrupt (in other words, that there is a direct write command).

Figure 16:
FIG. 16 shows an example of the construction of the read interrupt commands.
Figure 17:
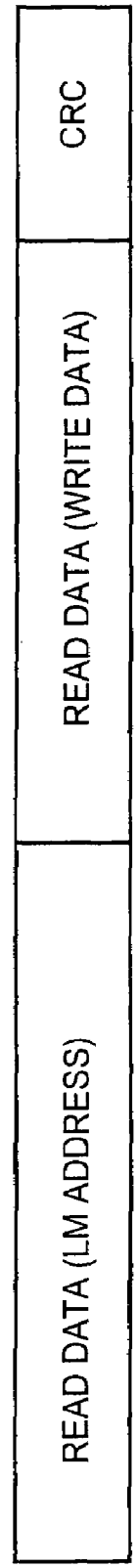
FIG. 17 shows an example of the construction of the data that is output from the relay adapter in response to a read interrupt command from the adapter on the receiving side.

When the transmission control part 904 receives a notification of a path interrupt, the transmission control part 904 transmits a read interrupt command of the type shown in FIG. 16, i. e., a command that contains an interrupt address (shown as "INT address" in the figures), and that contains "common memory read" as the command type, to the relay adapter 400. As a result, the reception control part 516 receives data of the type shown in FIG. 17, i. e., data that includes an LM address and write data, from the relay adapter 400. Furthermore, the INT address may be any address that makes it possible to calculate the storage location of data stored in the sub-buffer regions of the SM 470 or data stored in the buffer of the port selection control part 440 (e. g., this address may be an address that is individually assigned to the respective ports).

Figure 18:
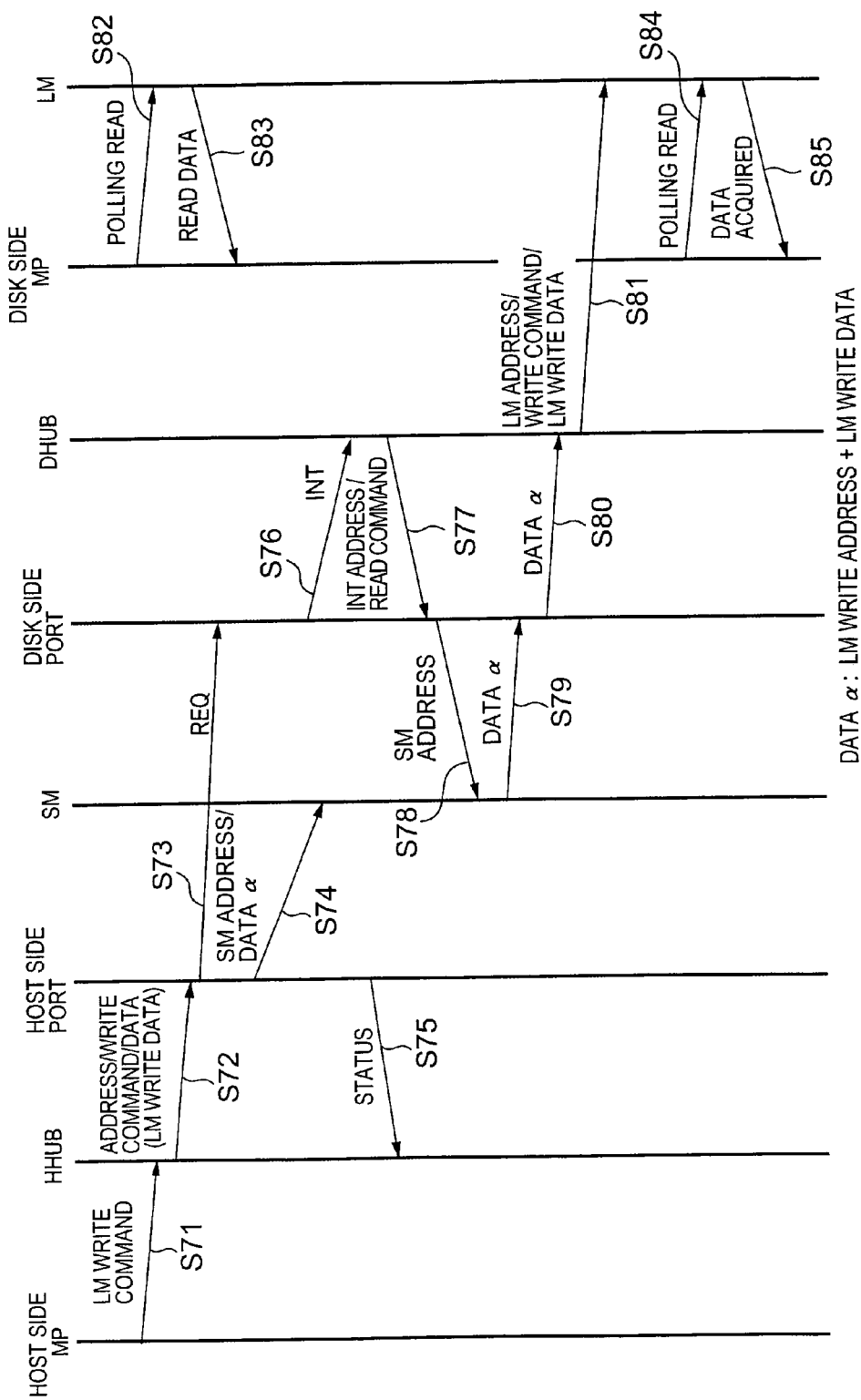
FIG. 18 shows the flow of the exchange of direct write commands in a case where direct write commands are stored in a specified sub-buffer region in the SM 470 in the second embodiment.
Figure 19:
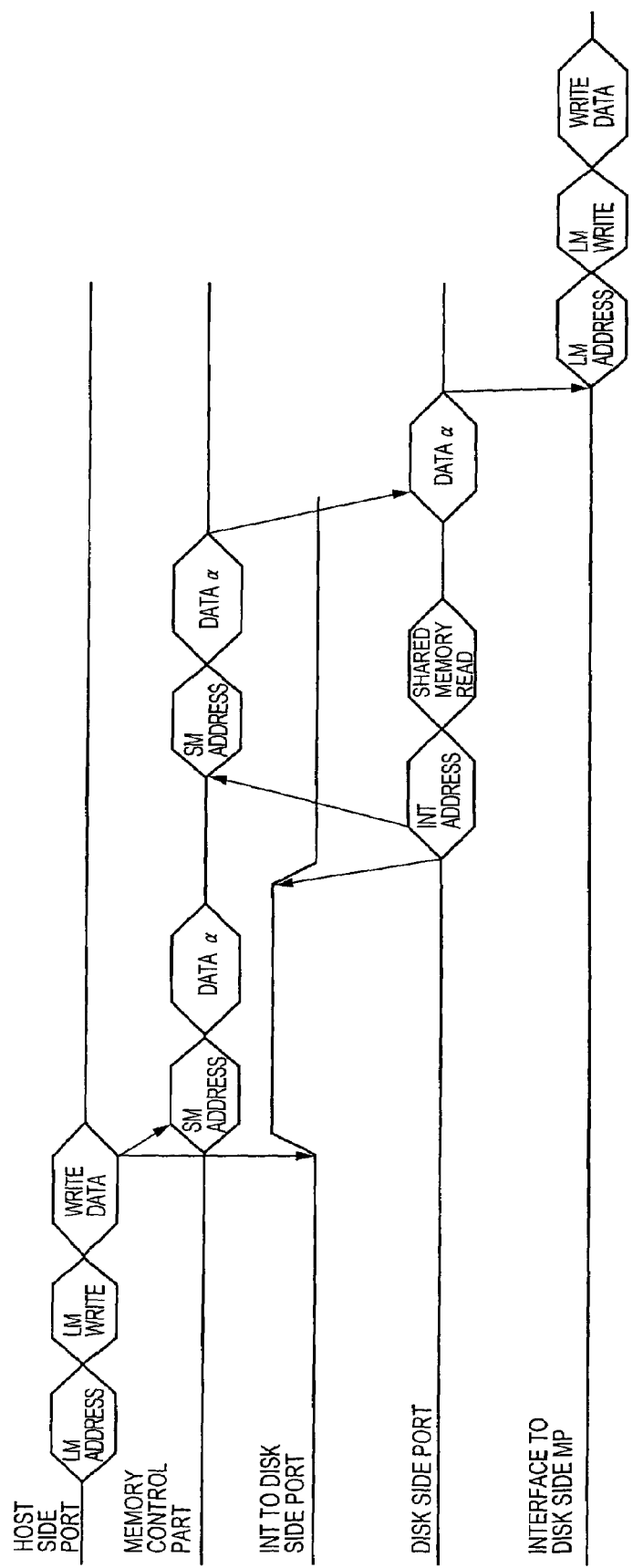
FIG. 19 shows a timing chart of the transmission and reception of commands in FIG. 18.

FIG. 18 shows the flow of the exchange of commands in a case where direct write commands are stored in a specified sub-buffer region of the SM 470 in the second embodiment. FIG. 19 shows a timing chart of the transmission and reception of commands in this case.

When a certain host side port 420A of the relay adapter receives a direct write command (a command containing an LM address, the command type "LM write" and write data) (S71, S72), the target port 430A is discriminated based on the LM address contained in this command and the port managing table 600, and a specified request signal is transmitted to this target port 430A (S73). Furthermore, inside the port controller 410, the SM address is calculated based on the LM address in the received direct write command, and this SM address and data α (LM address and write data) are input into the memory control part 460 (S74). The data α is stored in a specified sub-buffer region of the SM 470 by the memory control part 460.

Furthermore, the host side port 420A transmits status information indicating that a direct write command has been received to the connection destination host port 200A (S75).

In response to the request signal from the host side port 420A, the target port 430A causes the rise of a path interrupt signal to the path interrupt control part 903 of the connection destination disk port 901A (S76). Then, after the abovementioned data α has been stored in the SM 470, the target port 430A causes the fall of this path interrupt signal.

When the path interrupt control part 903 detects the fall of the path interrupt signal, the path interrupt control part notifies the transmission control part 904 that there is a path interrupt.

After being notified that there is a path interrupt, the transmission control part 904 transmits the abovementioned read interrupt command (a command containing an INT address and the command type "common memory read") to the target port 430A (S77). As a result, the SM address is fully discriminated from the INT address in the read interrupt command (e. g., a specified SM address is discriminated from a table in which one or more INT addresses and one or more SM addresses are caused to correspond), and the data α is read out from the discriminated SM address (S78, S79). Then, the data α that has been read out is transmitted to the disk adapter 900 (S80). Furthermore, the write data in the data α is directly written into the LM address in the data α (S81), and the destination MP 550A can acquire the written write data by polling a specified LM address in its own LM 560 (S82 through S85).

The above has been a description of a second embodiment. Furthermore, in this second embodiment, the direct write commands may always be transferred to the destination MP after being temporarily stored in a sub-buffer region of the SM 470, or may be transferred to the destination MP without being stored in this manner. In the latter case, for example, transfer may be performed by the flow described below. Specifically, after the direct write command is received in the relay adapter 400, the target port 430A causes the rise of a path interrupt signal to the path interrupt control part 903 of the connection destination disk port 901A; then, after a specified time has elapsed from this point in time, the path interrupt signal is caused to fall. In this case, the transmission control part 904 may transmit the abovementioned read interrupt command to the target port 430A, and in response to this, the reception control part 516 may receive the direct write command that is read out from the specified buffer of the port selection control part 440.

Furthermore, for example, the disk adapter was shown in FIG. 15. However, there may also be cases in which messages are transferred from the disk adapter to the host adapter; accordingly, the respective ports of the host adapter may also be constructed in the same manner as the respective ports of the disk adapter shown in FIG. 15.

Third Embodiment

Next, a third embodiment of the present invention will be described.

In this third embodiment, the respective MPs (e. g., the host MP 360A) store read commands sent by the direct LM write system or indirect LM write system in desired storage destination LMs (e. g., the disk side LM 550A), so that messages that are read from these LMs are received.

This third embodiment is an example of application of the abovementioned first embodiment. Specifically, when the MPs on the command transmission side of the read commands write these read commands into the command reception side LMs of the command reception side MPs by the direct LM write system or indirect LM write system, the command reception side MPs acquire messages destined for the command transmission side MPs from the command reception side LMs in response to these read commands, and store these messages in the command transmission side LMs of the command transmission side MPs by the direct LM write system or indirect LM write system. Subsequently, the command transmission side MPs acquire the messages by polling the command transmission side LMs. As a result, the command transmission side MPs acquire messages from the command reception side LMs.

Specifically, in the first embodiment, the message transmission source MPs actively issue messages to specified storage destination LMs without receiving read commands. In the case of the third embodiment, however, the message transmission source MPs store messages in their own LMs, read out these messages from their own LMs in response to read commands received from other MPs, and transmit these messages to the LMs of the other MPs that are the transmission sources of the commands.

This third embodiment will be described in detail below. Furthermore, in the following description, the description of parts that duplicate the first embodiment are is abbreviated or omitted.

Figure 20:
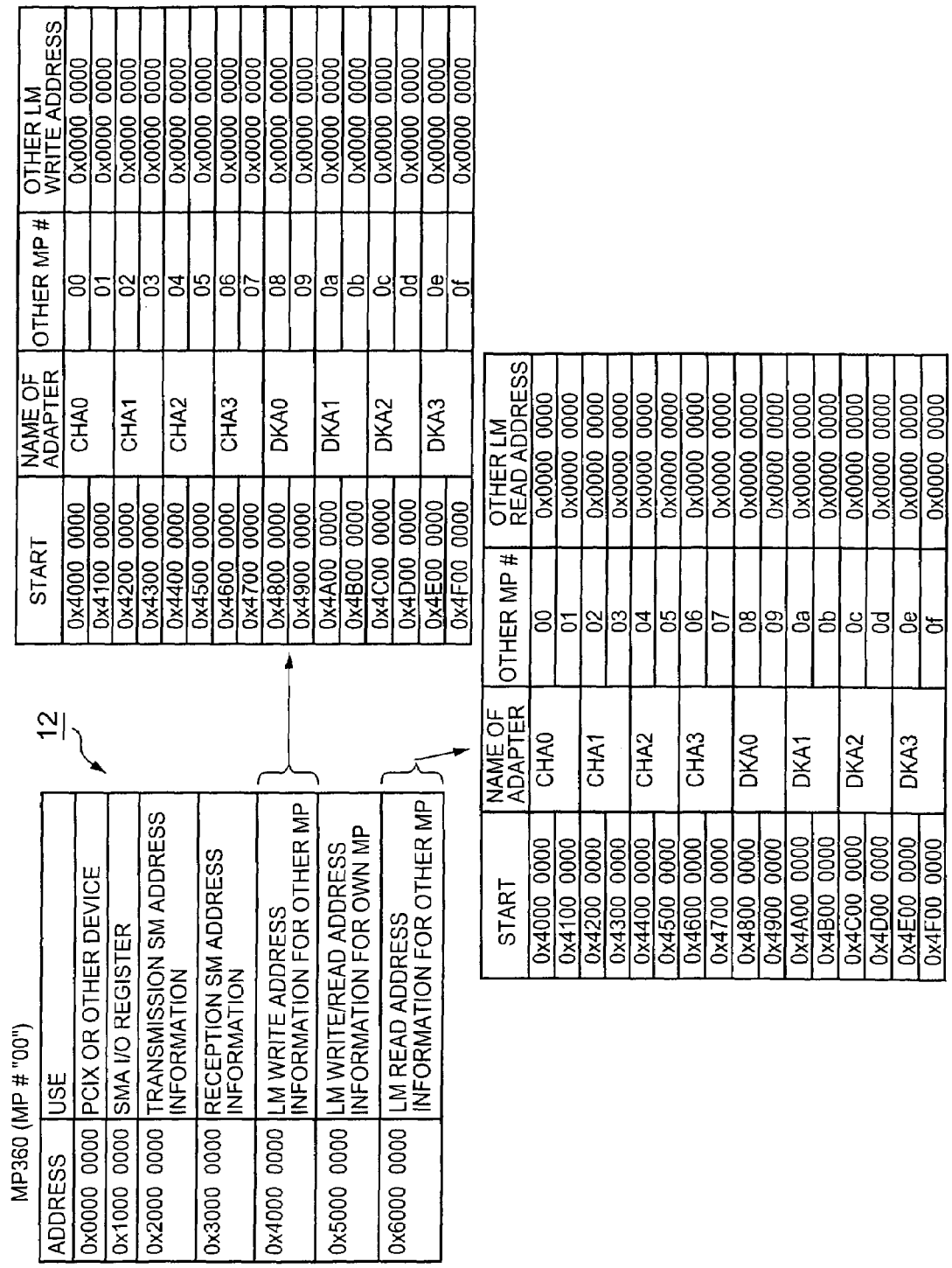
FIG. 20 shows one example of the address map in a third embodiment of the present invention.

FIG. 20 shows one example of the address map that is stored in each MP 360 (or 550) in the third embodiment.

Various types of information are recorded in the address map 12 that is stored in each MP 360 (or 550), e. g., in the host MP 360 whose MP discriminating information (indicated as "MP #" in the figure) is "00". However, examples of the main types of information in this case include own MP LM read/write address information, other MP LM write address information and other MP LM read address information, in addition to the transmission SM address information and reception SM address information described in the first embodiment.

The LM read/write address information comprises LM address ranges in one or more LMs 350 (or 560) of the MP in question. This information includes LM address ranges (one or a plurality of LM addresses) in which read commands for the MP 360 in question are stored, and LM write address ranges (one or a plurality of LM addresses) that are the storage destinations of messages for other MPs 550. Both LM read address ranges and LM write address ranges are provided for each of the other MPs (and/or each of the other LMs) (for example, these address ranges are caused to correspond to the MP # of each of the other MPs). Specifically, each of the one or more LM write address rages respectively corresponding to one or more other MPs is (for the corresponding other MP) an LM read address range that is a read destination for messages of this other MP. Specifically, each of the one or more LM write address rages respectively corresponding to one or more other MPs is (for the corresponding other MP) an LM write address range that is a storage destination for read commands issued by this other MP. Furthermore, each of the one or more LM write address ranges respectively corresponding to one or more other MPs is (for the corresponding other MP) an LM read address range that is a read destination for messages of this other MP.

The other MP LM write address information comprises LM address ranges in other LMs of other MPs; this information indicates LM write address ranges (one or a plurality of LM addresses) that are storage destinations for read commands issued by the MP 360 in question. As is shown in the figure, these LM write address ranges are provided for each of the other MPs (e. g., these address ranges are caused to correspond to the MP # of each of the other MPs). Specifically, each of the one or more LM write address ranges respectively corresponding to one or more other MPs is (for the corresponding other MP) an LM read address range that is a read destination for polling by the other MPs.

The other MP LM read address information comprises LM address ranges in other LMs of other MPs; this information indicates LM read address ranges (one or a plurality of LM addresses) that are read destinations for the MP 360 in question. As is shown in the figure, these LM read address ranges are provided for each of the other MPs (e. g., these address ranges are caused to correspond to the MP # of each of the other MPs). Specifically, each of the one or more LM read address ranges respectively corresponding to one or more other MPs is (for the corresponding other MP) an LM write address range that is a storage destination for messages to the abovementioned MP in question from the other MPs.

Thus, the abovementioned address map 12 is recorded in the program address space of each MP 360 or 550. As a result, read commands in which arbitrary LM read addresses are designated are written into arbitrary LM write addresses, in the LM write addresses of arbitrary target MPs 550 (or 360), by the micro-programs of the MPs 360 (or 550).

Below, the flow that occurs when messages are read out by the direct LM read system in the third embodiment will be described using a case in which the command transmission side MP is the host side MP 360A and the command reception side MP is the disk side MP 550A as an example, with this description being divided into the two cases shown below.

(1) First case: a case in which read commands sent by the direct LM write system are temporarily stored in the sub-buffer regions of the SM 470.

Figure 21:
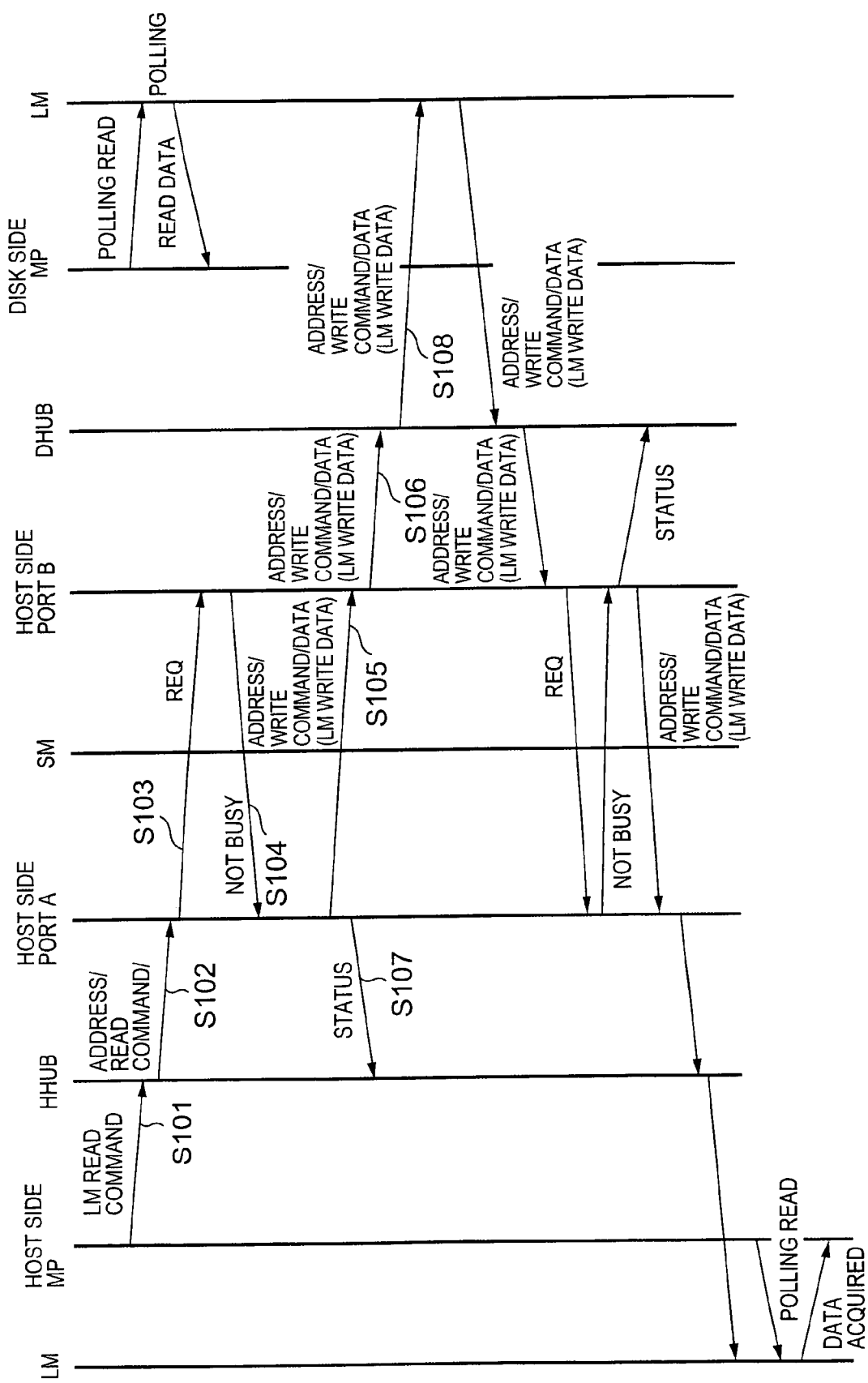
FIG. 21 shows the flow of the exchange of data that is performed when read commands of the direct LM write system are not temporarily stored in a sub-buffer region of the SM 470 in the third embodiment.

The flow of the exchange of data that is performed by the adapters 300, 400 and 500 in this first case is shown in FIG. 21.

The host side MP 360A acquires the LM read address (address indicating the location from which data is to be read) and LM write address (storage destination of read commands) corresponding to the desired partner MP 550A from the address map 12 stored by this host side MP 360A itself, and outputs read commands that designate the acquired LM read address and read commands that contain the acquired LM write address to the MP bus 2. Accordingly, these read commands are transmitted to the transmission control part 318 of the host port 200A corresponding to the MP 360A in question via the MP path control part 311 and access control part 316. The transmission control part 318 converts these read commands into a specified format, and transmits command groups whose format has thus been converted (i. e., the abovementioned read commands indicating the LM write address and the command type "direct LM write") to the reception control part 421 of the host side port 420A that is the connection destination of the host port 200A (S102).

The reception control part 421 of the host side port 420A of the port controller 410 temporarily stores the command groups received from the transmission control part 318 of the host port 200A in a specified buffer 601A in the port selection control part 440. Furthermore, this reception control part 421 discriminates which of the disk side ports 430A through 430n is to be used based on the LM write addresses contained in these command groups and the port managing table 600, and transmits a specified request signal to the discriminated target port 430A (i. e., the disk side port corresponding to the storage destination LM address) (S103). In response to this request signal, when the host side port 420A receives a signal indicating that the target port 430A (or port path control part 602A corresponding to this target port 430A) is not in use (shown as "not busy" in the figure) (S104), i. e., when the target port 430A is not in use, the command groups in the buffer 601A are read out and transferred to the disk adapter 500 via transmission control part 432 of the target port 430A (S105, S106). Furthermore, the transmission control part 442 of the host side port 420A transmits a notification indicating that the transfer of the command groups has been completed to the reception control part 319 of the connection destination host port 200A (as a result, it can be confirmed in the host adapter 300 that the transfer of the output command groups has been completed) (S107).

The reception control part 51 of the disk port 520A that receives the command groups from the relay adapter 400 sends these command groups (i. e., LM write addresses and read commands) to the LM address control part 514.

The LM address control part 514 calculates the accurate LM addresses using the LM write addresses received from the reception control part 516 and the base address stored by the LM base address setting part 513, and transfers these LM write addresses and the read commands received from the reception control part 516 to the MP path control part 515.

The MP path control part 515 writes the read commands received from the LM address control part 514 into the LM write address received from the LM address control part 514 (in other words, the LM read address corresponding to the transmission source MP 360 in the LM 560A in the abovementioned own MP LM read/write address information of the address map stored by the disk side MP 550A) via the processor bus 6 (S108).

For example, the disk side MP 550A writes messages for the transmission source MP 360 into the LM write address corresponding to the own MP write address information among the own MP write address information in its own LM 560A.

Based on the own MP LM read/write address information of the address map stored by the disk side MP 550A itself, the disk side MP 550A polls the LM read address corresponding to the transmission side MP 360 in its own LM 560A (i. e., periodically reads this LM read address). In this case, if there is a read command in this LM read address, the disk side MP 550 acquires the message from the LM read address designated in this read command, and transmits this message to the host side MP 360A that is the read command transmission source by the direct LM write system or indirect LM write system (as a result of the construction of the address map, the message that is acquired and transmitted here is always a message for the MP that is the transmission source of the read command). Furthermore, a description of the type of flow whereby this message is stored in the host side LM 350A was omitted; however, this will be understood from the description of the first embodiment.

(2) Second case: a case in which read commands are transmitted by the direct LM write system, and these read commands are temporarily stored in a sub-buffer region of the SM 470.

Figure 22:
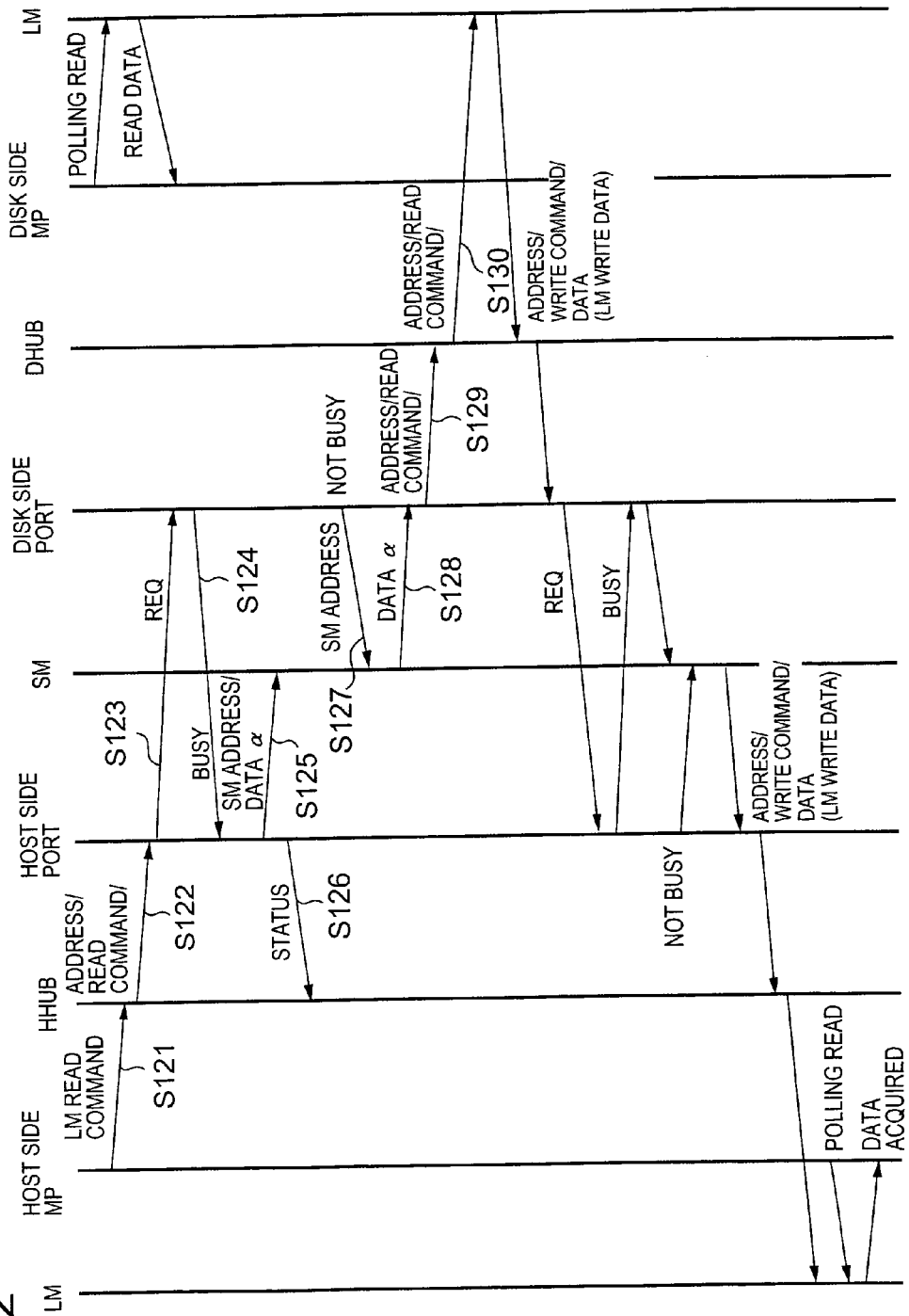
FIG. 22 is a diagram which shows the flow of the exchange of data that is performed when read commands of the direct LM write system are transmitted, and these read commands are temporarily stored in a sub-buffer region of the SM 470 in the third embodiment.

The flow of the exchange of data that is performed by the adapters 300, 400 and 500 in this second case is shown in FIG. 22.

The reception control part 421 of the host side port 420A receives the abovementioned command groups (LM write addresses and read commands) in a flow similar to that of the abovementioned first case (S121, S122), temporarily stores these command groups in a specified buffer 601A, discriminates the target port 430A based on the LM addresses contained in these commands and the port managing table 600, and transmits a specified request signal to the target port 430A (S123). In response to this request signal, when the host side port 420A receives a signal from the target port 430A indicating that the target port 430A is in use (shown as "busy" in the figure) (S124), i. e., when the target port 430 is in use, the path switching control part 650 notifies the address decoder 451 of the LM write addresses in the received commands, and transmits the LM write addresses and read commands contained in the received command groups to the memory control part 460 as data α (S125). Subsequently, the host side port 420A transmits a notification indicating that the transfer of the command groups has been completed to the reception control part 319 of the host port 200A (S126).

When the address decoder 451 is notified of an LM write address from the port selection control part 440, the address decoder 451 discriminates the destination MP 550A of the read command from this LM write address, selects the stack pointer corresponding to the discriminated MP 550A, and transmits a write request for this MP 550A to the stack pointer table 453.

When the stack pointer table 453 receives a write request for a certain destination MP 550A from the address decoder 451, the stack pointer table 453 increases the write pointer for this MP 550A by one increment, and transmits the updated value of the stack pointer and the discriminating information for the MP 550 that was the object of pointer updating to the address control part 456, "buffer full" judgement part 454 and threshold value judgement part 455.

Based on the value of the write pointer received from the stack pointer table 453 and the base address of the SM 470 that is set beforehand in the port controller 410, the address control part 456 calculates the SM write address that indicates the location in the SM 470 where data is to be stored. The address control part 456 notifies the memory control part 460 of the calculated SM write address.

When the memory control part 460 receives an SM write address from the address control part 456, the memory control part 460 stores the data α received from the port selection control part 440, i. e., the LM write address and read command, in this SM write address.

Subsequently, when the target port 430A is no longer in use, the target port 430A automatically issues a read request for the data α containing the message stored in the sub-buffer region of the SM 470 to the port selection control part 440 (in other words, issues the command shown in FIG. 11), or issues such a read request in response to a periodic inquiry from the port selection control part 440.

The path switching control part 650 of the port selection control part 440 ascertains the MP discriminating information for the destination disk side MP 550A corresponding to this port 430A from the port 430A that originated the read request and the port managing table 600, and sends this MP discriminating information to the address decoder 451.

When the address decoder 451 receives this MP discriminating information from the port selection control part 440, the address decoder selects the stack pointer corresponding to the MP 550A that has this discriminating information, and transmits a read request for this MP 550A to the stack pointer table 453.

When the stack pointer table 453 receives a read request for this MP 550A, the stack pointer table 453 decreases the read pointer and write pointer by one decrement, and transmits the updated value of the pointer and the discriminating information for the MP 550A that was the object of pointer updating to the address control part 456, "buffer full" judgement part 454 and threshold value judgement part 455.

Based on the value of the read pointer received from the stack pointer table 453 and the base address of the SM 470 that is set beforehand in the port controller 410, the address control part 456 calculates the SM read address that indicates the location in the SM 470 from which data is to be read. The address control part 456 notifies the memory control part 460 of the calculated SM read address (S127).

When the memory control part 460 receives an SM read address from the address control part 456, the memory control part 460 reads out the data α that is located in this SM read address (i. e., the set of LM write address and message that is stored in the sub-buffer region) (S128), and transfers this data α to the target port 430A that originated the abovementioned read request via the port selection control part 440. As a result, this data α is converted into a specified format by the transmission control part 432 of the target port 430A (e. g., is converted into command groups containing LM write addresses and read commands), and is transmitted to the reception control part 516 of the disk port 520A (S129).

Subsequently, in a flow similar to that of the abovementioned case 1, read commands destined for the disk side MP 550A are written into the LM 560A of this MP 550A without the interposition of this MP 550A (S130), and the MP 550A can acquire read commands addressed to itself by polling its own LM 560A. Subsequently, furthermore, in a flow similar to that of the abovementioned first case, the messages in the LM read addresses discriminated from these read commands are stored in the LM 350A of the transmission source MP 360A of the read commands.

The above has been a description of a third embodiment of the present invention.

Furthermore, in this third embodiment, when there is no message in the LM read address (in the command reception side LM) discriminated from the read command issued from the command transmission side MP, a message may be stored in this LM read address, and may then be immediately read out and transmitted to the command transmission side LM.

Furthermore, although a description of this was omitted, monitoring of the SM buffer threshold value table 314 and SM buffer full table 315 may also be similarly performed when read commands are stored in the SM 470. Specifically, in this third embodiment as well, specified status information may be issued to the command transmission side adapter based on such monitoring results, and processing such as limitation of the frequency with which read commands are issued, limitation of the quantity of read commands issued or the like may be performed in the command transmission side adapter based on this status information.

Furthermore, in the third embodiment, for example, the address map 12 may be constructed so that the MP that stores this address map 12 can discriminate which of its own LM write addresses contain stored messages that are to be sent back when read commands are stored in which of its own LM read addresses. In this case, the LM read addresses may be contained in the read commands.

Furthermore, in the third embodiment, the storage of read commands in the command reception side LMs from the command transmission side MPs and/or the storage of read information for the command transmission side MPs (write information or the command transmission destinations) that is read out from the command receptions side LMs may be performed by the abovementioned relay part master system, or may be performed by the reception side master system described in the second embodiment.

Several preferred embodiments of the present invention have been described above. However, these embodiments are merely examples used to illustrate the present invention; the scope of the present invention is not limited to these embodiments alone. The present invention may also be worked in various other aspects.

For example, in the first through third embodiments, data that is the object of writing output by the host computer 200 (e. g., data files designated by the user) is written into physical or logical memory regions in the physical disk groups 9 via the host adapter 300, relay adapter 400 and disk adapter 500, and data that is the object of reading, which is read from these memory regions, is transmitted to the host computer 200 via the disk adapter 500, relay adapter 400 and host adapter 300 (strictly speaking, via the SM 470 or a separate memory (e. g., a cache memory) that is provided between the disk adapter 500 and host adapter 300). However, information that is directly written into the LMs is not limited to the abovementioned messages that are transferred between MPs; such information may also be the abovementioned data that is the object of writing or data that is the object of reading. In such cases, the size of the data that is the object of writing or data that is the object of reading ordinarily varies according to the specific data involved; however, when such data is transferred between MPs, this data may be transferred after being divided into units of a specified size (when the quantity of data is smaller than this specified size, the data may be adjusted to the specified size by adding dummy data). Furthermore, in this case, for example, in regard to the direct LM write system, the data that is the object of writing or data that is the object of reading may be transferred without passing through the abovementioned separate memory (e. g., cache memory), while in the case of the indirect LM write system, the data that is the object of writing or data that is the object of reading may be temporarily stored in the abovementioned separate memory (e. g., cache memory) and then transferred.

Figure 23:
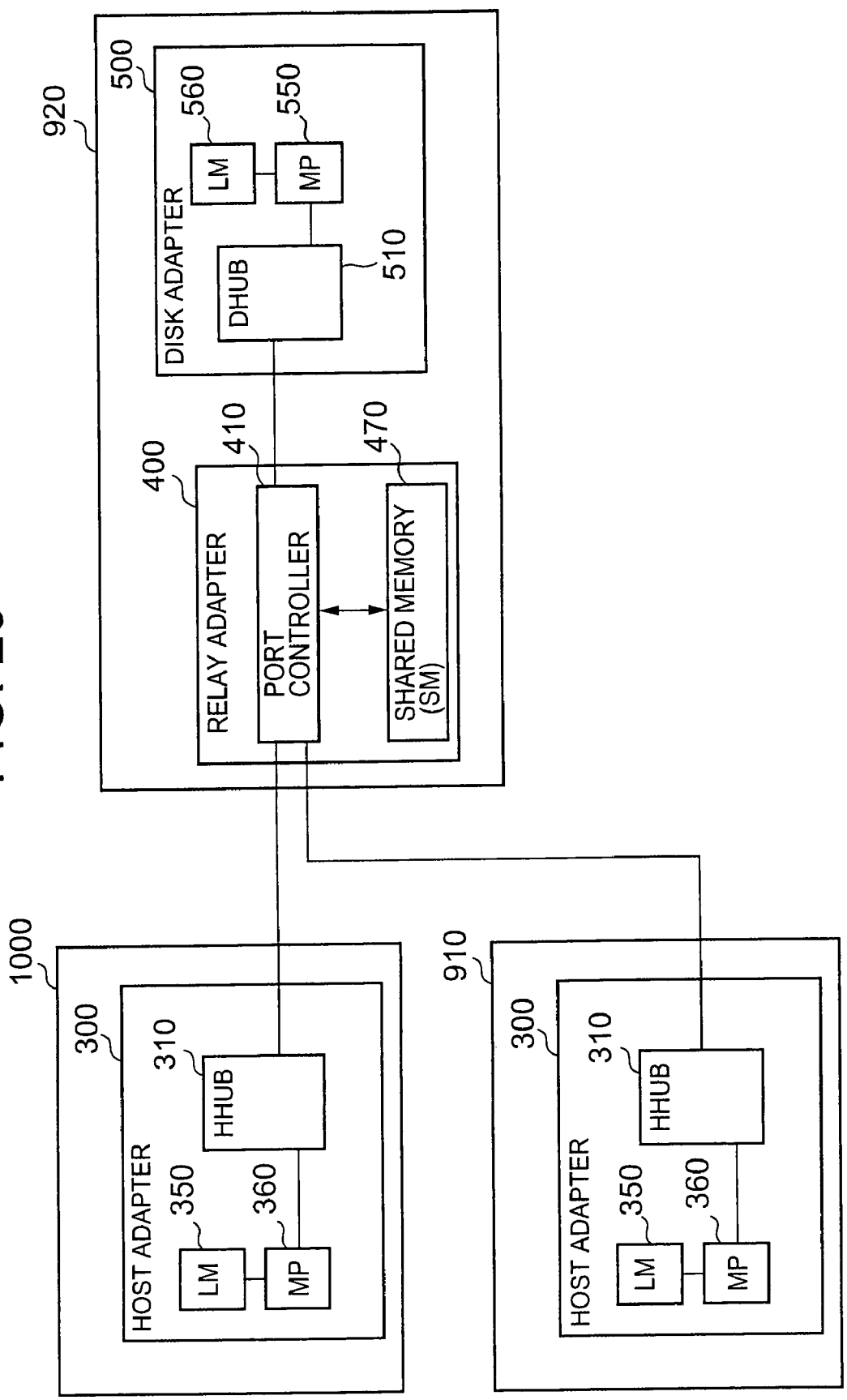
FIG. 23 is a diagram which shows one example of a first connection variation of the host adapter 300 and disk adapter 500.
Figure 24:
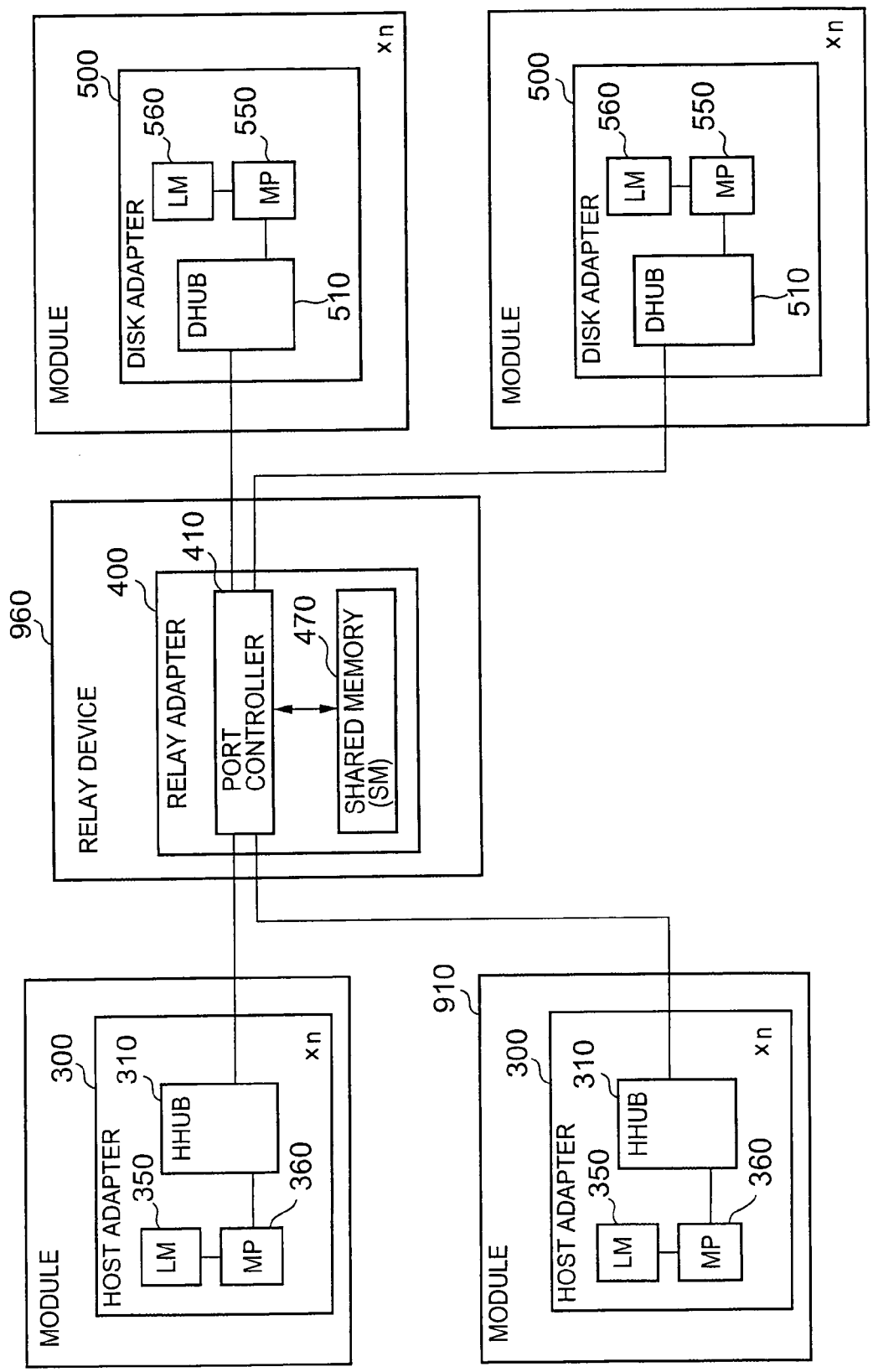
FIG. 24 is a diagram which shows one example of a second connection variation of the host adapter 300 and disk adapter 500.
Figure 25:
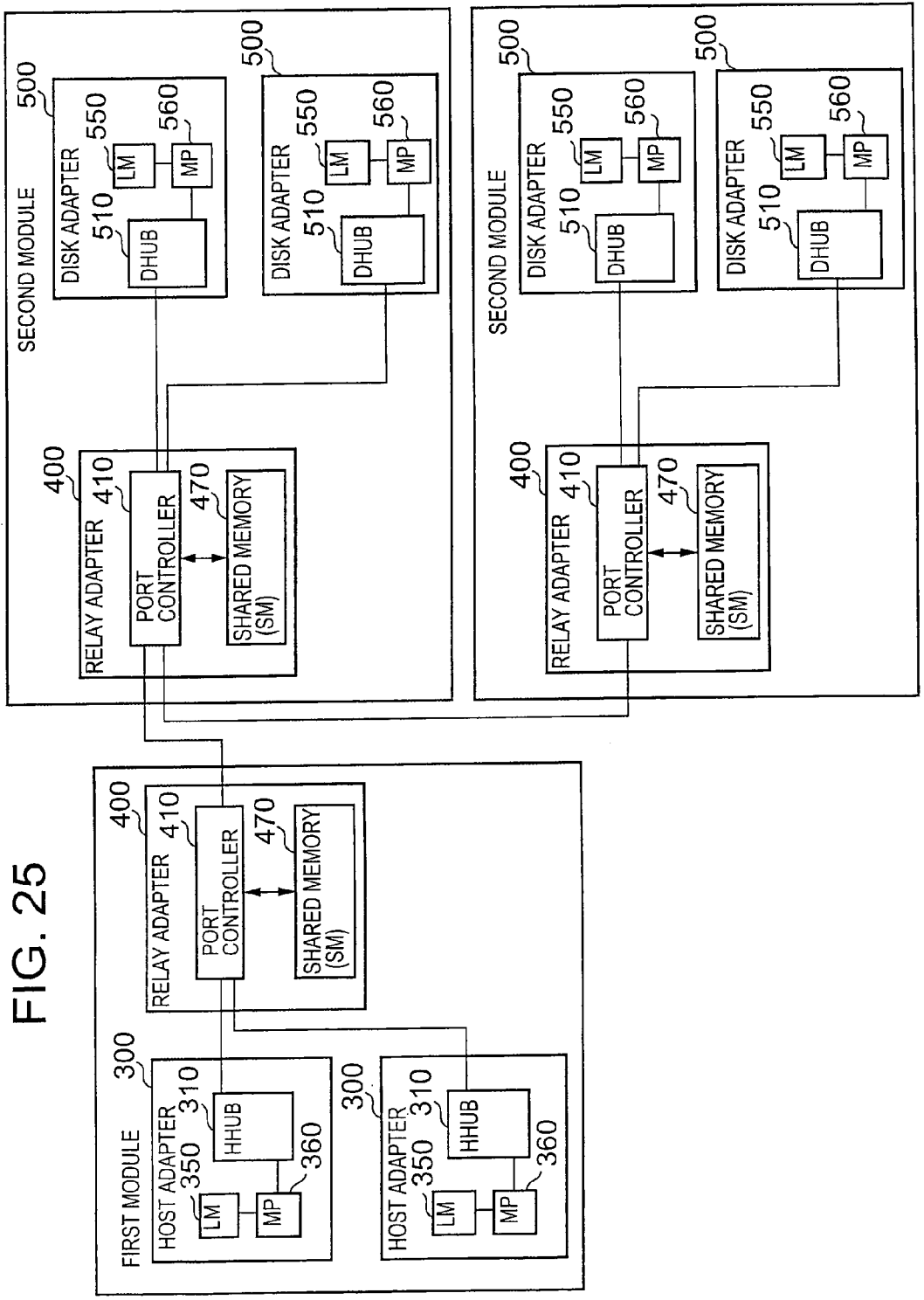
FIG. 25 is a diagram which shows one example of a third connection variation of the host adapter 300 and disk adapter 500.

Furthermore, for example, various connection variations are conceivable in terms of how the abovementioned host adapter 300 and disk adapter 500 are connected. For example, in a first connection variation, the adapters 300 and 500 in separated modules (e. g., disk array control devices) 1000, 910 and 920 are connected via a relay adapter 400 as shown in FIG. 23. Furthermore, for example, in a second connection variation, a plurality of separate modules that have n adapters 300 or 500 are connected via a relay device 960 so that communication is possible as shown in FIG. 24. Furthermore, for example, in a third connection variation, as shown in FIG. 25, a first module (e. g., a disk array control device) which has one or more host adapters 300 and a relay adapter 400 and second modules (e. g., disk array control devices) which have one or more disk adapters 500 and a relay adapter 400 are provided, and the plurality of relay adapters 400 respectively mounted in the plurality of modules are connected to each other.

Furthermore, for example, in the disk array device 100, the system may be devised so that a first mode in which the respective MPs actively transmit write information (e. g., messages, data that is the object of reading or data that is the object of writing) to other MPs as in the first embodiment, and a second mode in which the respective MPs transmit write information in response to read commands from other MPs as in the third embodiment, are selectively performed. Which of these two modes is use may be set at a specified timing, either manually or automatically.

What is claimed is:

1. An information processing device which processes information using a plurality of processors, comprising:
   one or more first processors that have one or a plurality of first local memories;
   one or more second processors which performs one of directly writing write information into a target first local memory that a target first processor, selected from among said first processors, has, and directly reading read information from said target first local memory;
   address map memory means for storing a first address map in which the first local memory addresses for each of said one or more first processors are recorded,
   wherein each of said one or more second processors performs one of acquiring the first local memory address of said target first processor from said first address map, writing said write information into the acquired first local memory address, and reading said read information from the acquired first local memory address; and
   a relay device which receives said write information from said one or more second processors and transfers the write information to said target first processor,
   wherein said relay device comprises:
   a relay memory having one or more write information storage regions respectively corresponding to said one or more transmission sources or transmission destinations, and
   wherein when transferring said write information, said relay device selectively performs an operation of said transfer after said write information is temporarily stored in one or more of said write information storage regions of said relay memory, or an operation of said transfer without storing said write information in said relay memory.

2. The information processing device according to claim 1, further comprising:
   one or a plurality of second local memories belonging to each of said one or more second processors;
   first address map memory means for storing a first address map on which the first local memory addresses for each of said one or more first processors are recorded; and
   second address map memory means for storing a second address map on which second local memory addresses for each of said one or more second processors are recorded;
   wherein a target second microprocessor selected from among said one or more second processors acquires a first local memory write address indicating where writing is to be performed in said target first local memory from said first address map, and writes write information into said acquired first local memory address, and
   wherein when said write information that has been written into said first local memory write address is a read command, said target first processor, in response to said read command, acquires the second local memory write address indicating where writing is to be performed in said target second local memory on the target second processor that originated said read command from said second address map, reads out information in said first local memory, and writes said information into said acquired second local memory write address.

3. The information processing device according to claim 1, further comprising:
   one or a plurality of first devices that have said one or more first processors,
   wherein said relay device further comprises:
   one or a plurality of transmitting parts which are respectively connected to the said one or a plurality of first devices, and which respectively transmit the received write information to said one or a plurality of first devices, and
   wherein when write information received from a certain second device is to be transmitted to the target first device that has said target first processor, if the target transmitting part that is to transmit this write information is not in a busy state, the received write information is transmitted to the target first device from said target transmitting part without being stored in the relay memory, while if said target transmitting part is in a busy state, the write information is temporarily stored in the relay memory, and this write information is read out from the relay memory and transmitted to said target first device from the target transmitting part when the busy state of said target transmitting part is released.

4. The information processing device according to claim 1, wherein when temporarily storing the received write information in the target write information storage region corresponding to the transmission source or transmission destination of the relay memory, if the amount of information accumulated in said target write information storage region exceeds a first threshold value, a notification of exceeding the first threshold value, which indicates that this threshold value has been exceeded, is transmitted to a specified second device, and the second device that receives said notification of exceeding the first threshold value reduces the frequency with which write information is issued or the amount of write information that is issued to said target local memory or said target first processor.

5. An information processing device which processes information using a plurality of processors, comprising:
one or more processors that have one or a plurality of first local memories;
one or more second processors which performs one of directly writing write information into a target first local memory that a target first processor, selected from among said first processors, has, and directly reading read information from said target first local memory;
address map memory means for storing a first address map in which the first local memory addresses for each of said one or more first processors are recorded,
wherein each of said one or more second processors performs one of acquiring the first local memory address of said target first processor from said first address map, writing said write information into the acquired first local memory address, and reading said read information from the acquired first local memory address;
a relay device which receives said write information from said one or more second processors and transfers the write information to said target first processor,
wherein said relay device comprises:
a relay memory, and
wherein when transferring said write information, said relay device selectively performs an operation of said transfer after said write information is temporarily stored in said relay memory, or an operation of said transfer without storing said write information in said relay memory, and
wherein one or more write information storage regions respectively corresponding to said one or more transmission sources or transmission destinations are provided in said relay memory, and when temporarily storing the received write information in the relay memory, the relay device stores this write information in a target write information storage region corresponding to the transmission source or transmission destination, and in such cases, furthermore, if the amount of information accumulated in the target write information storage region exceeds a second threshold value, notification of exceeding the second threshold value, which indicates that this threshold value has been exceeded, is transmitted to a specified second device, this second device selectively executes the operation of a direct write system in which said write information is directly written into the target local memory, or the operation of an indirect write system which is devised so that said write information is stored in the relay memory, and so that said target first processor can acquire this write information from the relay memory, and when said notification of exceeding the second threshold value is not received, the write information is transmitted by said direct write system, while when said notification of exceeding the second threshold value is received, the write information is transmitted by said indirect write system.

6. An information processing device which processes information using a plurality of processors, comprising:
one or more first processors that have one or a plurality of first local memories;
one or more second processors which performs one of directly writing write information into a target first local memory that a target first processor, selected from among said first processors, has, and directly reading read information from said target first local memory;
address map memory means for storing a first address map in which the first local memory addresses for each of said one or more first processors are recorded,
wherein each of said one or more second processors performs one of acquiring the first local memory address of said target first processor from said first address map, writing said write information into the acquired first local memory address, and reading said read information from the acquired first local memory address;
a relay device which receives said write information from said one or more second processors and transfers the write information to said target first processor,
wherein said relay device comprises:
a relay memory, and
wherein when transferring said write information, said relay device selectively performs an operation of said transfer after said write information is temporarily stored in said relay memory, or an operation of said transfer without storing said write information in said relay memory,
wherein one or more write information storage regions respectively corresponding to one or more transmission sources or transmission destinations of the write information are provided in said relay memory, and when temporarily storing the received write information in the relay memory, the relay device stores this write information in the target write information storage region corresponding to the transmission source or transmission destination, and in such cases, furthermore, if the amount of information accumulated in said target write information storage region exceeds a first threshold value, a notification of exceeding the first threshold value, which indicates that this threshold value has been exceeded, is transmitted to a specified second device, and the second device that receives said notification of exceeding the first threshold value reduces the frequency with which write information is issued or the amount of write information that is issued to said target local memory or said target first processor, and
wherein if the amount of information accumulated in said target write information storage region exceeds the second threshold value that is larger than said first threshold value, the relay device transmits a notification of exceeding the second threshold value, which indicates that this threshold value has been exceeded, to said second device, said second device selectively executes the operation of a direct write system in which the write information is directly written into the target local memory, or the operation of an indirect write system which is devised so that the write information is stored in the relay memory, and so that said target first processor can acquire this write information from the relay memory, and when said notification of exceeding the second threshold value is not received, even though the notification of exceeding the first threshold value is received, the write information is transmitted by said direct write system, while when said notification of exceeding the second threshold value is received, said direct write system is stopped, and the write information is transmitted by said indirect write system.

7. The information processing device according to claim 5, wherein after the second device that has received said notification of exceeding the second threshold value has selected said indirect write system, this second device stops the indirect write system and selects said direct write system in at least one of the following cases (1) and (2):

(1) a case in which the amount of information in said target information storage region is equal to or less than a third threshold value which is smaller than said second threshold value, and (2) a case in which a fixed time has elapsed in the state in which said indirect write system was selected.

8. The information processing device according to claim 1, further comprising:

one or a plurality of first devices that have said one or more first processors;

one or a plurality of second devices that have said one or more second processors; and a relay device that relays said write information from said second devices to said first device that has the target first processor;

wherein said relay device has one or a plurality of transmitting parts that respectively transmit information to said one or a plurality of first devices, and one or a plurality of receiving parts that respectively receive information from said one or a plurality of second devices, and each of said one or a plurality of transmitting parts and each of the said one or a plurality of receiving parts operate independently of each other.

9. The information processing device according to claim 1, wherein one or more local storage regions respectively corresponding to said one or more second processors are provided in the local memories of each of said one or more first processors, each of said one or more second processors stores an address map on which the local memory address of said local storage region corresponding to this second processor is recorded for each first processor, and when the write information is written into the local memory of the target first processor, the local memory address corresponding to this target first processor is acquired from said address map, and the write information is written into this acquired local memory address.

10. The information processing device according to claim 1, further comprising a relay device which receives said write information including the local memory address of the target first processor from said one or more second processors, and transfers this write information to said target first processor, wherein each of said one or more second processors is connected via the relay device so as to be able to respectively communicate with said one or more first processors by one or more logical or physical paths, the relay device stores one or more local memory addresses respectively corresponding to said one or more paths for each second processor, and when transferring said received write information, a target path corresponding to said local memory address contained in said received write information is specified, and the write information is transferred to said target first processor via the specified target path.

11. A memory control device which comprises a plurality of microprocessors and a physical or logical memory device, and which performs memory control of the storage of information from host devices in said memory device using said plurality of microprocessors, comprising:

one or more first microprocessors that have one or a plurality of first local memories;

one or more second microprocessors; and a first address map memory part that stores a first address map on which the first local memory addresses for each of said one or more first microprocessors are recorded, wherein each of said one or more second microprocessors acquires, from said first address map, a first local memory write address indicating where writing is to be performed in a target first local memory, which a target first microprocessor selected from among said first microprocessors, has, and writes write information into the acquired first local memory write address, a relay device which receives said write information from said one or more second processors and transfers the write information to said target first processor, wherein said relay device comprises:

a relay memory having one or more write information storage regions respectively corresponding to said one or more transmission sources or transmission destinations, and wherein when transferring said write information, the relay device selectively performs an operation of this transfer after the write information has been temporarily stored in one or more of said write information storage regions of the relay memory, or an operation of this transfer without storing the write information in the relay memory.

12. The memory control device according to claim 11, further comprising:

one or a plurality of first devices in which said one or more first microprocessors are mounted;

one or a plurality of second devices in which said one or more second microprocessors are mounted; and a relay device which relays communications between said one or a plurality of first devices and said one or a plurality of second devices;

wherein one or more local storage regions that respectively correspond to said one or more second microprocessors are provided in said first local memories, first local memory addresses of the one or more local storage regions that respectively correspond to said one or more first microprocessors are recorded on said first address map, each of said one or more second microprocessors can be connected via the relay device so as to be able to respectively communicate with said one or more first microprocessors by one or more logical or physical paths, and furthermore, when outputting said write information, the second microprocessors acquire the first local memory address of the first local storage region corresponding to said target first processor from said first address map, and output write information which has first transmission destination information that includes said acquired first local memory address, the relay device stores one or more sets of second transmission destination information that respectively correspond to said one or more paths, and when transferring the received write information, the relay device specifies the target path based on said first and second transmission destination information, and transmits the write information to said target first device via the specified target path, and the target first device writes the write information received from the relay device into the first local memory address that is included in the write information.

13. The memory control device which comprises a plurality of microprocessors and a physical or logical memory device, and which performs memory control of the storage of information from host devices in said memory device using said plurality of microprocessors, comprising:
one or more first microprocessors that have one or a plurality of first local memories:
one or more second microprocessors;
a first address map memory part that stores a first address map on which the first local memory addresses for each of said one or more first microprocessors are recorded,
wherein each of said one or more second microprocessors acquires, from said first address map, a first local memory write address indicating where writing is to be performed in a target first local memory, which a target first microprocessor selected from among said first microprocessors, has, and writes write information into the acquired first local memory write address;
one or a plurality of first devices in which said one or more first microprocessors are mounted;
one or a plurality of second devices in which said one or more second microprocessors are mounted; and
a relay device which relays communications between said one or a plurality of first devices and said one or a plurality of second devices;
wherein one or more local storage regions that respectively correspond to said one or more second microprocessors are provided in said first local memories;
first local memory addresses of the one or more local storage regions that respectively correspond to said one or more first microprocessors are recorded on said first address map, each of said one or more second microprocessors can be connected via the relay device so as to be able to respectively communicate with said one or more first microprocessors by one or more logical or physical paths, and furthermore, when outputting said write information, the second microprocessors acquire the first local memory address of the first local storage region corresponding to said target first processor from said first address map, and output write information which has first transmission destination information that includes said acquired first local memory address, the relay device stores one or more sets of second transmission destination information that respectively correspond to said one or more paths, and when transferring the received write information, the relay device specifies the target path based on said first and second transmission destination information, and transmits the write information to said target first device via the specified target path, and the target first device writes the write information received from the relay device into the first local memory address that is included in the write information
wherein said relay device comprises:
a relay memory having one or more write information storage regions respectively corresponding to said one or more transmission sources or transmission destinations, and
wherein when transferring said write information, the relay device selectively performs an operation of this transfer after the write information has been temporarily stored in one or more of said write information storage regions of the relay memory or an operation of this transfer without storing the write information in the relay memory.

14. The memory control device according to claim 12, wherein said relay device is communicably connected to said one or a plurality of first devices, further comprises one or a plurality of transmitting parts that respectively transmit the received write information to said one or a plurality of first devices, and when transferring write information received from a certain second device to said target first device, if the target path is not in a busy state, the received write information is transmitted to the target first device via the this target path without being stored in the relay memory, while if the target path is in a busy state, the write information is temporarily stored in the relay memory, and when the busy state of the target path is released, the write information is read out from the relay memory and transmitted to the target first device via the target path.

15. The memory control device according to claim 13, wherein when the received write information is temporarily stored in a target write information storage region corresponding to the transmission source or transmission destination in the relay memory, if the amount of information accumulated in the target write information storage region exceeds the first threshold value, a notification of exceeding the first threshold value, which indicates that this threshold value has been exceeded, is transmitted to a specified second device, and the second device that has received this notification of exceeding the first threshold value has been exceeded reduces the frequency with which write information is issued or the amount of write information that is issued to said target local memory or said target first microprocessor.

16. The memory control device according to claim 12, wherein said relay device comprises one or a plurality of transmitting parts that respectively transmit information to said one or a plurality of first devices, and one or a plurality of receiving parts that respectively receive information from said one or a plurality of second devices, each of said one or a plurality of transmitting parts and each of said one or a plurality of receiving parts operate independently from each other.

17. The memory control device according to claim 16, wherein said relay device comprises a receiving buffer that is separate from said relay memory, each of said one or a plurality of receiving parts once store the write information received from said second devices in this receiving buffer.

18. A memory control device which comprises a plurality of microprocessors and a physical or logical memory device, and which controls the storage of information from host devices in said memory device using said plurality of microprocessors, this memory control device comprising:
one or more first microprocessors that have one or a plurality of first local memories;
one or more second microprocessors that have one or a plurality of second local memories;
a first address map memory means for storing a first address map on which first local memory addresses for each of said one or more first microprocessors are recorded; and
a second address map memory means for storing a second address map on which second local memory addresses for each of said one or more second microprocessors are recorded;
wherein a target second microprocessor selected from among said second microprocessors acquires, from the first address map, a first local memory write address indicating where writing is to be performed in a target first local memory which a target first microprocessor selected from among said first microprocessors has, and writes a read command into the acquired first local memory write address, and wherein in response to the read command that is written into the first local memory write address, the target first microprocessor acquires, from the second address map, the second local memory write address of the target second microprocessor that originated said read command, reads out read information in the first local memory, and writes the read information into the acquired second local memory write address, a relay device which receives said write information from said one or more second processors and transfers the write information to said target first processor, wherein said relay device comprises:

a relay memory having one or more write information storage regions respectively corresponding to said one or more transmission sources or transmission destinations, and wherein when transferring said write information, the relay device selectively performs an operation of this transfer after the write information has been temporarily stored in one or more of said write information storage regions of the relay memory, or an operation of this transfer without storing the write information in the relay memory.

19. An information processing method which processes information using a plurality of processors, comprising the steps in which:

each of one or more second microprocessors acquires a local memory address of a target first processor from an address map in which local memory addresses for each of one or more first processors having one or a plurality of local memories are recorded;

each of said one or more second processors performs one of writing write information into said acquired local memory address, and reading read information from said acquired local memory address, and a relay device which receives said write information from said one or more second processors and transfers the write information to said target first processor, wherein said relay device comprises:

a relay memory having one or more write information storage regions respectively corresponding to said one or more transmission sources or transmission destinations, and wherein when transferring said write information, said relay device selectively performs an operation of said transfer after said write information is temporarily stored in one or more of said write information storage regions of said relay memory, or an operation of said transfer without storing said write information in said relay memory.

20. An information processing device which processes information using a plurality of processors, comprising:

one or more first processors that have one or a plurality of first local memories;

one or more second processors which performs one of directly writing write information into a target first local memory that a target first processor selected from among said first processors has, and directly reading read information from said target first local memory; and a relay device which receives said write information from said one or more second processors and transfers the write information to said target first processor, Wherein said relay device comprises a relay memory having one or more write information storage regions respectively corresponding to said one or more transmission sources or transmission destinations, and wherein when transferring said write information, said relay device selectively performs an operation of said transfer after said write information is temporarily stored in one or more of said write information storage regions of said relay memory, or an operation of said transfer without storing said write information in said relay memory.

21. An information processing method which processes information using a plurality of processors, comprising the steps in which:

each of one or more second microprocessors acquires a local memory address of a target first processor from an address map on which local memory addresses for each of one or more first processors having one or a plurality of local memories are recorded; and each of said one or more second processors writes write information into said acquired local memory address, and/or reads read information from said acquired local memory address; and a relay device receives said write information from said one or more second processors and transfers the write information to said target first processor, wherein said relay device comprises a relay memory having one or more write information storage regions respectively corresponding to said one or more transmission sources or transmission destinations, and when transferring said write information, said relay device selectively performs an operation of said transfer after said write information is temporarily stored in one or more of said write information storage regions of said relay memory or an operation of said transfer without storing said write information in said relay memory.

22. An information processing device according to claim 1, wherein said relay device comprises:

a buffer that is separate from said relay memory, when transferring said write information, the relay device selectively performs an operation of said transfer after said write information is stored in said relay memory, an operation of said transfer after said write information is temporarily stored in said buffer.

23. A memory control device according to claim 11, wherein said relay device comprises:

a buffer that is separate from said relay memory, when transferring said write information, the relay device selectively performs an operation of said transfer after said write information is stored in said relay memory, an operation of said transfer after said write information is temporarily stored in said buffer.

24. A memory control device according to claim 18, wherein said relay device comprises:

a buffer that is separate from said relay memory, when transferring said write information, the relay device selectively performs an operation of said transfer after said write information is stored in said relay memory, an operation of said transfer after said write information is temporarily stored in said buffer.

25. An information processing method according to claim 19, wherein said relay device comprises:

a buffer that is separate from said relay memory, when transferring said write information, the relay device selectively performs an operation of said transfer after said write information is stored in said relay memory, an operation of said transfer after said write information is temporarily stored in said buffer.

26. An information processing method according to claim 20, wherein said relay device comprises;
   a buffer that is separate from said relay memory, when transferring said write information, the relay device selectively performs an operation of said transfer after said write information is stored in said relay memory, an operation of said transfer after said write information is temporarily stored in said buffer.

27. An information processing method according to claim 21, wherein said relay device comprises:
   a buffer that is separate from said relay memory, when transferring said write information, the relay device selectively performs an operation of said transfer after said write information is stored in said relay memory, an operation of said transfer after said write information is temporarily stored in said buffer.

28. An information processing device according to claim 22, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

29. A memory control device according to claim 23, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

30. A memory control device according to claim 24, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

31. An information processing method according to claim 25, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

32. An information processing method according to claim 26, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

33. An information processing method according to claim 27, wherein said relay further comprises:
   a plurality of ports, when write information received via a certain port of the ports is to be transmitted to the target first processor, if other port is not in a busy state, the received write information is temporarily stored in the buffer, and this write information is transmitted from the buffer to the target first processor via said other port, while if said other port is in a busy state, the write information is stored in the relay memory, and this write information is read out from the relay memory and transmitted to said target first processor via the other port when the busy state of said other port is released.

* * * * *